US011887051B1

(12) United States Patent
Guan et al.

(10) Patent No.: US 11,887,051 B1
(45) Date of Patent: *Jan. 30, 2024

(54) IDENTIFYING USER-ITEM INTERACTIONS IN AN AUTOMATED FACILITY

(71) Applicant: Amazon Technologies, Inc., Seattle, WA (US)

(72) Inventors: Danny Guan, Seattle, WA (US); Prathiban Mohanasundaram, Redmond, WA (US); Shannon Thomas, Seattle, WA (US); Mirko Mandic, Seattle, WA (US); Helene Causse, Seattle, WA (US); Brett Richard Taylor, Bainbridge Island, WA (US); Waqas Syed Ahmed, Clyde Hill, WA (US); David Echevarria Ignacio, Seattle, WA (US)

(73) Assignee: Amazon Technologies, Inc.WA (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/395,898

(22) Filed: Aug. 6, 2021

Related U.S. Application Data

(63) Continuation of application No. 15/470,105, filed on Mar. 27, 2017, now Pat. No. 11,087,271.

(51) Int. Cl.
*G06Q 10/087* (2023.01)
*G06V 20/40* (2022.01)
(Continued)

(52) U.S. Cl.
CPC ......... *G06Q 10/087* (2013.01); *G06F 3/0482* (2013.01); *G06F 3/04842* (2013.01);
(Continued)

(58) Field of Classification Search
CPC ...... G06Q 10/087; G06V 20/41; G06V 20/44; G06V 40/172; G06F 3/0482; G06F 3/0484
See application file for complete search history.

(56) References Cited

U.S. PATENT DOCUMENTS

| 6,032,128 A | 2/2000 | Morrison et al. |
|---|---|---|
| 7,703,044 B2 | 4/2010 | Graham |
| (Continued) | | |

OTHER PUBLICATIONS

Office Action for U.S. Appl. 15/470,301, dated Dec. 1, 2021, Guan, "Identifying user-item Interactions in Automated Facility", 16 pages.

(Continued)

*Primary Examiner* — Paul Danneman
(74) *Attorney, Agent, or Firm* — Lee & Hayes, P.C.

(57) ABSTRACT

Techniques for employing user interfaces to output information indicative of events occurring in an inventory facility, and receive feedback from a human regarding the events are described herein. In one implementation, an event may take place in an inventory facility, such as a customer taking an item from an inventory location, returning an item to an inventory location, and so forth. An automated system of an inventory management system may process sensor data collected by sensors in the inventory facility to determine details of the event. In some examples, the inventory management system is unable to determine with a high level of confidence what occurred during the event. The inventory management system may provide the sensor data to a human associate through an associate interface, and receive input regarding details of the event from the human associate through the associate interface.

20 Claims, 17 Drawing Sheets

(51) Int. Cl.
*G06V 40/16* (2022.01)
*G06F 3/0482* (2013.01)
*G06F 3/0484* (2022.01)
*G06F 3/04842* (2022.01)
*G06F 18/22* (2023.01)

(52) U.S. Cl.
CPC .............. *G06F 18/22* (2023.01); *G06V 20/41* (2022.01); *G06V 20/44* (2022.01); *G06V 40/172* (2022.01)

(56) References Cited

U.S. PATENT DOCUMENTS

| | | |
|---|---|---|
| 7,996,771 B2 | 8/2011 | Girgensohn et al. |
| 8,350,908 B2 | 1/2013 | Morris et al. |
| 8,412,656 B1 | 4/2013 | Baboo et al. |
| 8,665,333 B1 | 3/2014 | Sharma et al. |
| 8,830,291 B2 | 9/2014 | Kay et al. |
| 9,036,028 B2 | 5/2015 | Buehler |
| 9,069,770 B2 | 6/2015 | Werner et al. |
| 9,117,106 B2 | 8/2015 | Dedeoglu et al. |
| 9,235,928 B2 | 1/2016 | Medioni et al. |
| 9,449,343 B2 | 9/2016 | Mayerle et al. |
| 9,473,747 B2 | 10/2016 | Kobres et al. |
| 9,892,438 B1 | 2/2018 | Kundu et al. |
| 9,911,290 B1 | 3/2018 | Zalewski et al. |
| 10,089,675 B1 | 10/2018 | Rastogi et al. |
| 10,438,164 B1 | 10/2019 | Xiong et al. |
| 11,087,271 B1* | 8/2021 | Guan .................. G06Q 10/087 |
| 2003/0002712 A1 | 1/2003 | Steenburgh et al. |
| 2005/0132414 A1 | 6/2005 | Bentley et al. |
| 2006/0004582 A1 | 1/2006 | Claudatos et al. |
| 2006/0221184 A1 | 10/2006 | Vallone et al. |
| 2006/0288288 A1 | 12/2006 | Girgensohn et al. |
| 2007/0033632 A1 | 2/2007 | Baynger et al. |
| 2007/0182818 A1 | 8/2007 | Buehler |
| 2008/0292140 A1 | 11/2008 | Morris et al. |
| 2009/0183177 A1 | 7/2009 | Brown et al. |
| 2009/0288011 A1 | 11/2009 | Piran et al. |
| 2010/0135643 A1 | 6/2010 | Fleming |
| 2010/0271478 A1 | 10/2010 | Oya |
| 2011/0072132 A1 | 3/2011 | Shafer et al. |
| 2013/0182114 A1 | 7/2013 | Zhang et al. |
| 2013/0284806 A1 | 10/2013 | Margalit |
| 2014/0222603 A1 | 8/2014 | Hay |
| 2014/0289009 A1 | 9/2014 | Campbell |
| 2014/0363059 A1 | 12/2014 | Hurewitz |
| 2014/0365334 A1 | 12/2014 | Hurewitz |
| 2015/0029339 A1 | 1/2015 | Kobres et al. |
| 2015/0106721 A1 | 4/2015 | Cha et al. |
| 2015/0142587 A1 | 5/2015 | Salgar et al. |
| 2015/0278829 A1 | 10/2015 | Lu et al. |
| 2015/0286875 A1 | 10/2015 | Land et al. |
| 2015/0296187 A1 | 10/2015 | Baldwin |
| 2016/0110786 A1* | 4/2016 | Herring .................. G01B 11/00 705/26.35 |
| 2016/0203499 A1 | 7/2016 | Yamashita et al. |
| 2016/0300464 A1 | 10/2016 | Britton et al. |
| 2017/0256148 A1 | 9/2017 | King et al. |
| 2017/0278137 A1 | 9/2017 | Burke |
| 2017/0323376 A1* | 11/2017 | Glaser .................. G06Q 20/203 |

OTHER PUBLICATIONS

Atrey, ety al., "Timeline-based Information Assimilation in Multimedia Sureillance and Monitoring System", ACM, pp. 103-112.

Office Action for U.S. Appl. No. 15/470,301, dated Jan. 1, 2021, Guan, "Identifying user-item Interactions in an Automated Facility", 12 Pages.

Office Action for U.S. Appl. No. 15/470,105, dated Feb. 1, 2021, Guan, "Identifying user-item Interactions in an Automated Facility", 7 Pages.

Office Action for U.S. Appl. No. 15/470,105, dated Mar. 10, 2020, Guan, "Identifying user-item Interactions in an Automated Facility", 6 Pages.

Office Action for U.S. Appl. No. 15/470,301, dated Apr. 12, 2021, Guan, "Identifying user-item Interactions in an Automated Facility", 14 pages.

Office Action for U.S. Appl. No. 15/470,301, dated Jun. 12, 2020, Guan, "Identifying user-item Interactions in an Automated Facility", 11 Pages.

Office Action for U.S. Appl. No. 15/470,301, dated Sep. 24, 2020, Guan, "Identifying user-item Interactions in an Automated Facility", 12 Pages.

Office Action for U.S. Appl. No. 15/470, 105, dated Oct. 20, 2020, Guan, "Identifying user-item Interactions in an Automated Facility", 7 Pages.

Office Action for U.S. Appl. No. 15/470,207, dated Dec. 24, 2020, Guian, "Identifying user-item Interactions in an Automated Facility", 6 Pages.

Office Action for U.S. Appl. No. 15/470,301, dated May 20, 2019, Guan, "Identifying user-item Interactions in an Automated Facility", 40 pages.

Office Action for U.S. Appl. No. 15/470,105, dated Jun. 17, 2019, Guan, "Identifying user-item Interactions in an Automated Facility", 7 pages.

Office Action for U.S. Appl. No. 15/470,207, dated Jul. 11, 2019, Guan, "Identifying user-item Interactions in an Automated Facility", 7 pages.

Office Action for U.S. Appl. No. 15/470,207, dated Jul. 21, 2021, Guan, "Identifying user-item Interactions in an Automated Facility", 7 pages.

Office Action for U.S. Appl. No. 15/470,301, dated Jul. 30, 2021, Guan, "Identifying user-item Interactions in an Automated Facility", 13 pages.

Senior, et al., "Video Analytics for Retail" IEEE, 2007, pp. 423-428.

Senior, et al., "Visual Person Searches for Retail Loss Detection: Application and Evaluation", 2007, 10 pgs.

* cited by examiner

IDENTIFYING USER-ITEM INTERACTIONS IN AN AUTOMATED FACILITY

RELATED APPLICATIONS

This application claims priority to and is a continuation of U.S. patent application Ser. No. 15/470,105, filed on Mar. 27, 2017, the entire contents of which are incorporated herein by reference.

BACKGROUND

Product retailers and distributors maintain an inventory of items and products at physical locations which may be purchased, rented, leased, and so forth, by customers and consumers. For example, product retailers may maintain facilities and provide an inventory of items in customer areas or shopping areas of these facilities from which customers can pick items and take them to a cashier for purchase or rental. Thus, customers may pick up an items from their inventory storage locations, return items to their inventory storage locations, and move about within a facility. In some examples, product retailers and distributors may wish to monitor the actions of the customers and movement of the items.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

In FIG. 11, the three associates have identified more users as having performed an event during the inquiry at issue.

In FIG. 12, the three associates have identified more users as having performed an event during the inquiry at issue, and more items as having been interacted with by an identifier user during the inquiry at issue.

FIG. 14 illustrates a scenario where an associate was unsure about what occurred for a particular event in the session.

FIG. 15 illustrates a scenario where an item is identified as being returned to a location by a user, but was never originally identified as being taken from the location by the user.

DETAILED DESCRIPTION

Figure 1:
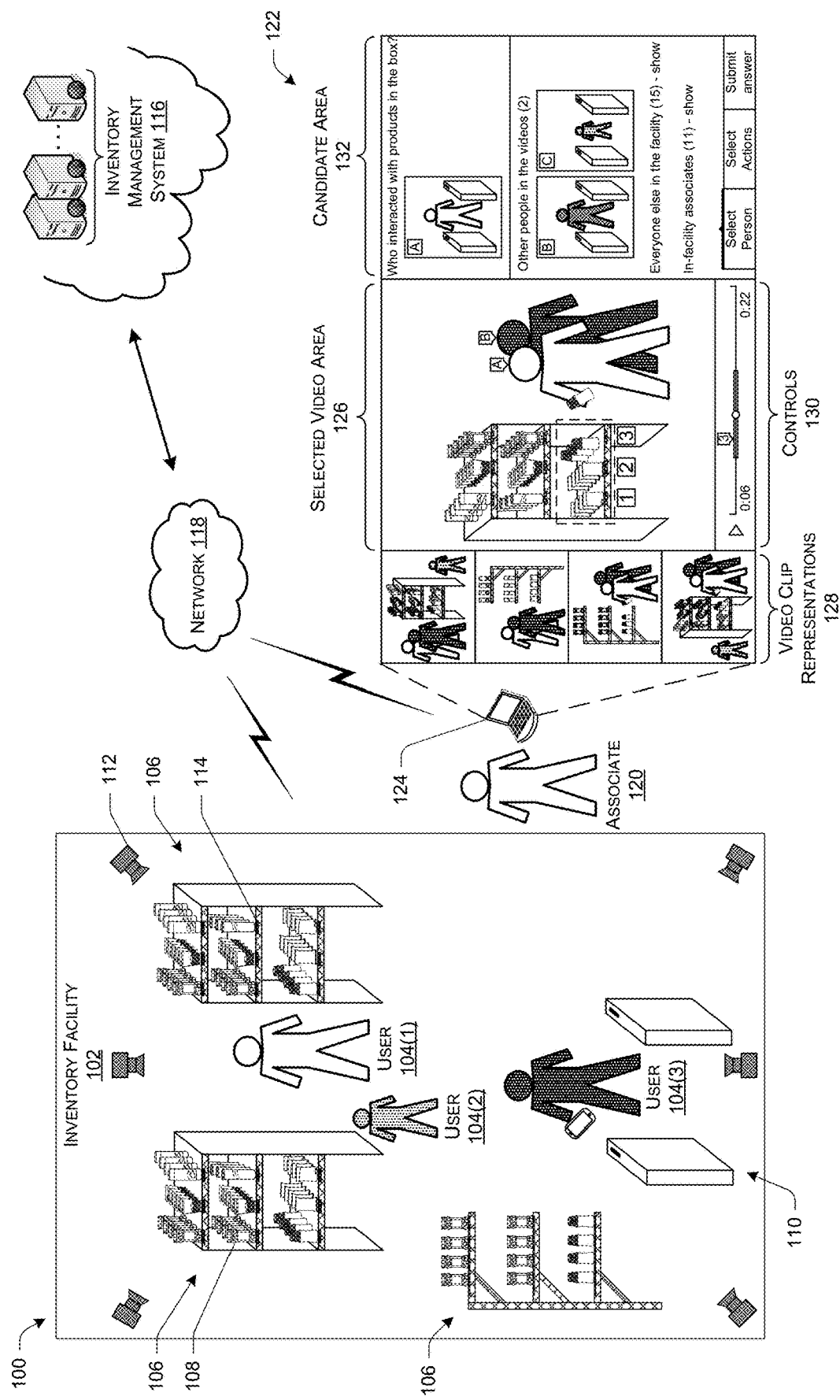
FIG. 1 is a schematic diagram of an illustrative architecture that includes an inventory facility, an inventory management system, and an associate interface to receive input regarding events occurring in the inventory facility.

Techniques for outputting information indicative of events occurring in materials handling facilities (facility), and receiving feedback regarding the events are described herein. In some examples, the facility may have an inventory management system which maintains information about items, users (e.g., customers, employees), and actions performed by the users with regards to the items. For example the inventory management system may monitor or maintain information about the facility, such as locations of the users within the facility, locations of items within the facility, and actions performed by users within the facility.

In various examples, the inventory management system may maintain such information about the facility using data obtained from one or more sensors positioned within the facility. For example, the inventory management system may receive data from cameras, radio-frequency identification (RFID) sensors, weight or load sensors, and so forth. Using this sensor data, the inventory management system may determine and monitor one or more events occurring within the facility. Events may involve interactions by users with items within the facility, such as taking an item from a location, returning an item to a location, or placing foreign items in storage locations of the facility. For example, a user may take an item offered for sale from an inventory location in the facility. Additionally, multiple users may take items from a same inventory location, or from inventory locations near each other.

The inventory management system may include one or more modules configured to automatically determine, based on the sensor data, what events are occurring within the facility and output data indicative of the events. The inventory management system may use various computer techniques, such as neutral networks, classifiers, and so forth, to determine what events are occurring within the facility. For example, the inventory management system may employ facial recognition techniques on image data obtained from cameras in the facility to identify users or may identify unique RFID information associated with user devices to monitor movements and locations of users within the facility. Further, the inventory management system may analyze weight or load sensor data to determine when items have been taken or returned to inventory locations and what items were taken or returned based on known item types for inventory locations. Using this and/or other sensor data, the inventory management system may automatically determine any items taken or returned by users. This may allow inventory management systems to automatically order new items when inventory for that item is running low, and track and charge users for the items they took from the facility without requiring a checkout station. For example, the inventory management system may output the data indicative of the events occurring within the facility to a supplier of a particular item so that the supplier knows when to reorder additional instances of the particular item, may output the data to a payment service to charge a customer for the items, or the like.

In some examples, it may be advantageous to use human input data to generate or confirm the output data that represents the events occurring within the facility. For example, the inventory management system may output inquiry data to one or more computing devices associated with one or more associates that provide support for operations of the facility.

The inquiry data may include some or all the sensor data obtained by sensors of the inventory management system. For example, the inquiry data may include image data, such as video data, obtained by cameras within the facility which depicts a location at which an event occurred for a period of time during which the event occurred. Additionally, the inquiry data may include weight sensor data that indicates inventory locations where items were taken or returned. The inventory management system may output the inquiry data using an associate interface on a computing device associated with an associate.

The associate interface may include one or more portions configured to present data collected by the sensors that represents the events that occurred within the facility, and one or more portions configured to receive input from an associate identifying details for the events that occurred within the facility and generate response data indicative of the input from the associate. For example, the associate interface may include a first portion that presents the data, or graphical representations of the data, collected by the sensors in order to inform the associate of what events occurred in the facility. The first portion may include an area to present video data captured by a camera in the facility that depicts a location at which an event occurred for a period of time including when the event occurred. Further, the first portion may include one or more controls for interacting with the video data. For instance, the first portion may include a timeline that represents the period of time of the video data that depicts the event. The timeline may include controls or be associated with controls that allow the associate to rewind the video, fast forward the video, skip portions of the video, pause the video, and so forth.

In some examples, additional cameras may be positioned in the facility and capture the location at which the event occurred from various angles. In such examples, the first portion may further include representations (e.g., thumbnails) of additional video data captured by the additional cameras that depict the location for the period of time from the various angles. When an associate selects a representation of one of the additional videos, the respective video data may be presented in the first portion of the associate interface, which allows the associate to view the event from different angles and vantage points.

The inventory management system may further output supplemental data which may be of use to apprise the associate of information about the event so the associate can more accurately input details for the events in the videos. In some examples, the supplemental data may include graphical overlays presented in the first portion of the associate interface that represent information obtained by various sensors. The graphical overlays may represent data obtained by weight or load sensors for inventory locations of items in the videos. For example, when the inquiry data is associated with determining which item of multiple items at an inventory location was interacted with by a user, one or more sensors may have detected a weight change for multiple items. In such examples, a bounding box may be graphically overlaid on the video in the first portion of the associate interface that surrounds the position of the multiple items depicted in the video to draw the associates attention to the items at issue in the event. In various examples, item identifiers (e.g., numerals) may be graphically overlaid on the video at inventory locations corresponding to the items at issue in the event for each item. Further, matching item identifiers may be placed along the timeline at times corresponding to when the weight sensors detected a change in weight for the item stored at the inventory location. In this way, as the associate views the video the item identifiers on the timeline may indicate to the associate that a weight sensor for an item in the video with the matching item identifier detected a change in weight at this particular time. In this way, the associate may be apprised of where to look as they view the video to identify details of the events.

In addition to the first portion which informs the associate about the event, the associate interface may further include a second portion which is configured to provide various interfaces for receiving input from an associate indicating details of the events. For example, the second portion of the associate interface may provide functionality to allow an associate to select or otherwise identify which user (e.g., customer) or users interacted with an item in the video data playing in the first portion of the associate interface. Additionally, the second portion may provide functionality to allow the associate to select or otherwise identify the type of interaction the selected users performed (e.g., take an item, return an item, move an item, etc.) and with which item the interaction was performed. Upon identifying the one or more users that interacted with items in the video for the inquiry, the types of interactions, and items interacted with, the associate providing input may submit their answer, causing the associate device to output data representative of the answer to the inventory management system. For example, envision that the associate determines that a particular user took a bag of chips from a shelf in the facility. Upon selecting a control on the associate interface to submit the answer, the associate device may send data indicative of the user's answer (that the particular user picked a bag of chips) to the inventory management system, which update a virtual shopping cart of the identified user to indicate the addition of the bag of chips.

In some examples, to achieve a high level of confidence as to what occurred in an event the inventory management system, several associates may view the sensor data associated with the inquiry and provide an answer for the inquiry. For example, three associates may view each inquiry and provide answers for what events occurred during the time period and at the location associated with the inquiry. If the associates answers are all in agreement as to what occurred, then the inventory management system may update the session for each user and take any necessary actions (e.g., charge the customer for the items purchased, order new inventory, etc.). However, in some examples, one or more of the associates may provide answers which differ with respect to what events occurred during the inquiry, or one of the associates may be unsure as to what events occurred for the inquiry.

In some examples, the inquiry may be escalated to an escalator associate to analyze the inquiry when one or more associates that attempted to answer the inquiry disagree or are unsure about what events occurred for the given inquiry. The escalator associate may be an associate with additional training or skill in analyzing inquiries, and may be selected based on the type of inquiry (e.g., entry inquiry, exit inquiry, shopping inquiry, etc.). The escalator associate may initially be presented with the associate interface, similar to the associates, and provide an answer as to events occurred for the inquiry. The associate interface may then present a comparison between the escalator associate's answer and the previous (e.g., three) associates' answers. The associate interface may highlight differences so the escalator associate can resolve the differences and make a final decision as to the events in the inquiry. However, in some examples the escalator associate may be unsure about what events occurred in the inquiry.

In some instances, a session review may be performed on an entire session, such as a shopping session of a particular user. The session review may be triggered by various triggers, such as the initial escalator being unsure about what events occurred in the video, a final virtual shopping cart of a user having less items than what the inventory management system identified the user as taking while in the facility, or a front line associate flagging the session for review. In some instances, the session review is assigned to the same or a different escalator associate as described above.

In a session review, the associate interface may present data depicting each event involving a user and may request input for one or more of the events. The associate interface may allow the associate to view each event in the user session to modify or confirm each event. In this way, the escalator associate can view all of the behaviors of the user and determine, in the context of the entire shopping session, what happened at each event. Once the second escalator associate confirms or modifies each event in the session, the escalator may save their final session answer which is output to the inventory management system. In this way, inquiries, which were unable to be resolved by three associates and a first escalator, may be determined by a second escalator associate in the context of the entire user session.

Thus, the techniques provided herein provide for accurate classification of interactions by users with items in a facility which an automated facility is unable to classify automatically using the generated sensor data. In some examples described below, the users interacting with items comprise customers of a retail facility. In other instances, however, the users may comprise any other type of user of a facility, such as employees operating in a fulfillment center or the like. In these instances, the techniques described herein may be used to validate actions taken by the employees when stocking shelfs, picking items for fulfillment to customers, or the like. Further, it is to be appreciated that the techniques may apply generally to identifying user actions without regard to the role of the specific users or the context of the facility.

While the techniques are primarily described herein with respect to a shopping facility, the techniques are generally applicable to any type of facility which manages items. For example, an automated facility may include warehouses, distribution centers, order fulfillment facilities, packaging facilities, shipping facilities, rental facilities, libraries, restaurants, retail stores, or any other types of facilities for performing functions of inventory management.

The techniques described herein provide for accurate classification of events in inventory management systems to generate output data used by an inventory management system for various functions to operate the facility. The feedback provided by the various human associates may further be used to train (e.g., using machine learning techniques) modules of the inventory management system to provide more accurate classification for events. The techniques described herein may improve the functioning of automated facility management systems as well as user experience in the facility.

FIG. 1 is a schematic diagram of an illustrative architecture 100 that includes an inventory facility 102 (e.g., environment) including with one or more users 104 (e.g., 104(1), 104(2), 104(3), etc.) or customers. The inventory facility 102 may include one or more inventory locations 106 (e.g., shelves) for storing one or more items 108. The inventory locations 106 and associated items 108 may be placed at predefined locations within the inventory facility 102. For example, the inventory locations 106 and items 108 may be placed at set locations which have set coordinates in three-dimensional (3D) space, and these locations may be stored in a database.

In some examples, the inventory facility includes one or more gates 110 which users 104 pass through when entering or exiting the inventory facility 102. The gates 110 may include one or more sensors to determine which customer is entering or exiting the inventory facility 102. For example, the gates 110 may have a sensor to detect an RFID tag for a computing device of a user 104 entering or exiting the inventory facility 102, or may have a scanner which reads information (e.g., barcode) off a computing device of a user 104 to identify the user. In some instances, the facility 102 may also include one or more cameras (e.g., overhead cameras) for generating image data for identifying users entering and exiting the store. For instance, the camera data may be used as an alternative to, or to supplement, any sensor data acquired at the gate itself (e.g., from an RFID reader, a scanner, etc.).

The inventory facility 102 may further have various sensors disposed within which track the movements of the users 104 and monitor the user 104 interactions with the items 108 at the various inventory locations 106. For example, the inventory facility may include one or more imaging sensors 112 to take images or videos as the users 104 move about the inventory facility 102 and interact with items 108 in the facility. In some examples, the imaging sensors 112 may continuously monitor respective regions of the inventory facility 102. For instance, a set of imaging sensors 112 may be assigned to record videos of a specific inventory location 106 from various angles and viewpoints. In some examples, the imaging sensors 112 may take pictures of users 104 and/or items 108. For instance, as users 104 enter and exit the inventory facility through the gate 110, the imaging sensors 112 may take pictures of the users 104. In some instances, imaging sensors 112 may be placed on the inventory locations 106, such as in shelves of the inventory locations 106, and take pictures of items 108 or rows or items 106 at various points in time.

The sensors of the inventory facility may further include weight sensors 114 disposed in the inventory locations 106 to detect movement of the items 108. For example, each item 108 or row of items 108 may have associated weight sensors 114 configured to detect changes in weight, which may indicate an item 108 is being taken, returned, or otherwise moved. The weight sensors 114 may measure the weight and changes in weight to determine if items 108 are being interacted with, and time stamp the various measurements. In various examples, additional sensors may be disposed within the facility, such as radio frequency (RF) sensors, temperature sensors, humidity sensors, vibration sensors, and so forth, to take measurements in the inventory facility 102.

The various sensors (e.g., imaging sensors 112, weight sensors 114, etc.) may be configured to provide information suitable for tracking users 104, items 108, or other objects in the inventory facility 102. For example, the sensors may be used to identify what items 108 are taken by which users 104 and placed in a shopping cart or carried by the user 104.

The inventory facility 102 and sensors may include, or be communicatively coupled to, an inventory management system 116. For example, the inventory facility 102 and/or sensors may communicate with the inventory management system 116 using a network 118. The network 118 may represent an array of wired networks, wireless networks (e.g., WiFi), or combinations thereof. The inventory management system 116 contains one or more modules configured to interact with users 104 or devices such as the sensors, robots, material handling equipment, computing devices, and so forth, in the inventory facility 102. The inventory management system 116 may further include modules configured to receive data from the sensors (e.g., imaging sensors 112, weight sensors 114, etc.) and analyze the received sensor data to identify events that occurred within the inventory facility 102. For instance, the inventory management system may detect events such as the entry of a user 104 into the inventory facility 102, stocking of items 108 at an inventory location 106, picking of an item 108 by a user 104 from an inventory location 106, placement of an item 108 within a cart of a user 104, movement of the users 104 relative to each other, exiting of a user 104 from the inventory facility 102, returning of an item 108 by a user 104 to an inventory location 106, and so forth. For example, the inventory management system 116 may have modules configured to perform facial recognition on a user 104 in a video captured by an imaging sensor 112 to determine an identify of the user 104, and analyze data from a weight sensor 114 to determine an item 108 was taken from an inventory location 106 near the identified user 104, and determine that the identified user 104 took the item 108 from the inventory location 106.

Upon determining an occurrence of the event, the inventory management system 116 may be configured to generate and output data which comprises information about the event. For example, if the event comprises an item 108 being taken from an inventory location 106, the output data may comprise an item identifier indicative of the particular item 108 that was removed from the inventory location 106.

The inventory management system 116 may use one or more automated systems to generate the output data about the event. For example, neural networks, classifiers, or other automate computing techniques may be used to process the sensor data and generate output data for the event. The automated systems may operate using probabilistic or non-probabilistic techniques. For example, the automated systems may use a Bayesian network. In another example, the automated systems may use support vector machines to generate the output data. The automated systems may generate confidence level data that provides information indicative of the accuracy or confidence that the output data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 108, user 104, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space. The confidence level may be determined based at least in part on these differences.

In some situations, the automated techniques may be unable to generate output data with a confidence level above a threshold value. For example, the automated techniques may be unable to distinguish which user 104 in a crowd of users 104 has picked up the item 108 from the inventory location 106. In such examples, it may be advantageous for an associate 120 to provide input to identify details of an event that the automated techniques are unable to determine.

In such examples, the inventory management system 116 may output data, such as sensor data, item 108 data, user 104 data, and so forth, that is associated with an event or events as inquiry data for an associate 120 to analyze and provide additional input. For example, the inventory management system 116 may present an associate interface 122 on a display associated with the inventory management system 116. The inventory management system 116 may reside at one or more different locations. In some instances, some or all of the resources of the inventory management system 116 may reside at or near the inventory facility 102. In such examples, the inventory management system 116 may comprise one or more displays arranged throughout the inventory facility 102 for associates 120 to access and provide input through using the associate interface 122. In other instances, some or all of the resources of the inventory management system 116 may reside remotely from the inventory facility 102. For instance, some or all of the inventory management system 116 may generally refer to a network-accessible platform—or "cloud-based service"— implemented as a computing infrastructure of processors, storage, software, data access, and so forth that is maintained and accessible via the network 118, such as the Internet. Cloud-based services may not require end-user knowledge of the physical location and configuration of the system that delivers the services. Common expressions associated with cloud-based services, such as the inventory management system 116, include "on-demand computing", "software as a service (SaaS)", "platform computing", "network accessible platform", and so forth. In such examples, the inventory management system 116 may output the inquiry data to an associate computing device 124 which is a device associate with an associate 120. The associate computing device 124 may comprise any type of computing device, such as a desktop computer, laptop computer, tablet computer, and so forth, communicatively coupled to the inventory management system 116 and accessible by an associate 120. In some examples, the associate 120 may be located at the inventory facility 102, while in other examples, the associate 120 may be located at a secure workstation that is remote from the inventory facility 102, as shown in FIG. 1. In some examples, the associate 102 may be located remote from the inventory facility 102 and access the associate computing device 124, which may comprise a secure workstation accessible by the associate 120 when the associate 120 authenticates themselves (e.g., enters password). Associate computing device 124 may send data to and receive data from the inventory management system 116 over the networks 118, and/or be located at a location associated with the inventory management system 116.

The associate interface 122 may include one or more portions configured to present inquiry data, such as data collected by the sensors that represents the events that occurred within the facility, and one or more portions configured to receive input from an associate identifying details for the events that occurred within the facility and generate response data indicative of the input from the associate. For instance, the associate interface 122 may include a selected video area 126 which presents image data, such as a video, depicting a location of the inventory facility 102 at which an event occurred that the inventory management system 116 is unable to accurately classify or determine. The selected video area 126 presents videos for the associate 120 to determine details of the events captured in the videos. The associate interface may further include one or more video clip representations 128. The video clip representations 128 may comprise thumbnails or other representations of video clips captured by other imaging sensors 112 in the inventory facility 102. The video clip representations 128 may represent videos obtained by the other imaging sensors 112 from various angles and locations that, when selected by an associate 120, present the respective video in the selected video area 126. In this way, the associate 120 may view the location where the event occurred from various angles to better discern the details of the event. The associate interface 122 may further include controls 130 which allow the associate 120 to interact with the video presented in the selected video area 126, such as a timeline to control which portion of the video is being viewed. The selected video area 126 and/or the controls 130 may further include various graphical indicators to further present information to the associate 120 to help the associate determine the events that occurred for the inquiry. These graphical indicators will be described in more detail in the remaining figures.

The associate interface 122 may further include a candidate area 132 configured to receive input from the associate 120 regarding the details of the events depicted in the video for the inquiry. For example, the candidate area 132 may present various user interfaces which allow the associate 120 to select or identify which user 104 or users 104 interacted with which items 108 shown in the selected video area 126, as well as the types of interactions (e.g., take, return, untidy take, untidy return, etc.).

While FIG. 1 illustrates one example of the associate interface 122, and subsequent figures illustrates additional examples, it is to be appreciated that the interfaces described herein may be used to identify any type of information regarding events that occur within the facility 102. That is, the interfaces may be generated to allow associates to resolve ambiguity with regard to any type of event within the facility 102. For example, the interface 122 may request that the associate resolve ambiguity around what item was picked, what item was returned, whether an item was picked or returned at all, whether the item was placed or picked from the appropriate location, the quantity of items taken, the identity of the user picking or returning the item, the identity of a user generally, whether a first user passed an item to a second user and the identities of these users, an identity of a user entering the facility 102, an identity of a user exiting the facility, or any other type of event that may occur within the facility 102.

Figure 2:
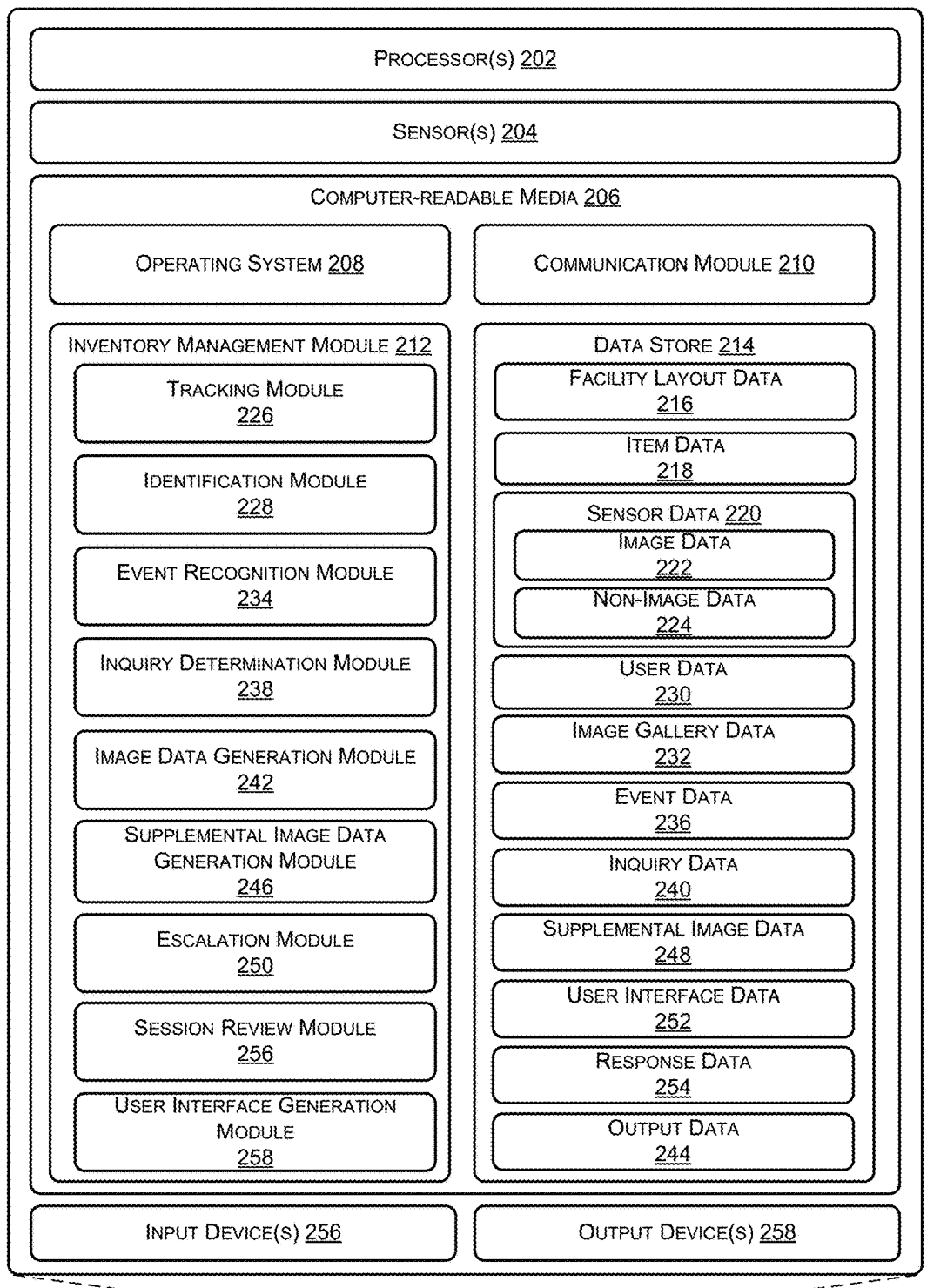
FIG. 2 shows a functional block diagram of selected components implemented at an inventory management system, such as the inventory management system of FIG. 1.

FIG. 2 shows a functional block diagram of selected components implemented at an inventory management system 200, such as the inventory management system 116 of FIG. 1. The inventory management system 200 may be physically present at the inventory facility 102, may be accessible by the network 118, or a combination of both. The inventory management system 200 does not require end-user knowledge of the physical location and configuration of the system that delivers the services. Common expressions associated with the inventory management system 200 may include "servers," "on-demand computing," "software as a service (SaaS)," "platform computing," "network-accessible platform," "cloud services," "data centers," and so forth. Services provided by the inventory management system 200 may be distributed across one or more physical or virtual devices.

The inventory management system 200 may include one or more processors 202 configured to execute computer-readable instructions. The inventory management system 200 may further include one or more sensors 204, such as the imaging sensors 112, the weight sensors 114, or any other sensor described with respect to FIG. 1. The inventory management system 200 may further include computer-readable media 206 which stores various modules for performing the event determination techniques described herein, such as an operating system 208, a communication module 210, an inventory management module 212, and a data store 214.

The operating system 208 may generally include computer-executable instructions configured to manage various resources of the inventory management system 200, such as hardware resources, and provide various services to applications or modules executing on the processor(s) 202. The communication module 210 may be configured to establish communications with one or more of the sensors 204, one or more of the devices used by associates 120 (e.g., associate device 124), or other devices.

The inventory management module 212 may be configured to provide various inventory and event functions described herein with respect to the inventory management system 116. For example, the inventory management module 212 may identify users 104, track movements of the users 104, track movements of the items 108, generate user interface data, etc.

The inventory management module 212 may access information stored in the data store 214 in the computer-readable media 206. In some implementations, the data store 214 or a portion of the data store 214 may be distributed across one or more other devices including servers, network attached storage devices, and so forth.

The data store 214 may include facility layout data 216 which provides a mapping of physical locations within the inventory facility 102, such as the layout of devices and objects such as the sensors (e.g., imaging sensors 112, weight sensors 114, etc.), inventory locations 106, and so forth. The facility layout data 216 may indicate the coordinates within the inventory facility 102 of an inventory location 106, sensors within view of that inventory location 106, and so forth. For example, the physical layout data 216 may include camera data comprising one or more of a location within the inventory facility 102 of an imaging sensor 112, orientation of the imaging sensor 112, the operational status, and so forth. Continuing example, the physical layout data 216 may indicate the coordinates of the imaging sensor 112, pan and tilt information indicative of a direction that a field of view of an imaging sensor 112 is oriented along, whether the imaging sensor 112 is operating or malfunctioning, and so forth. Further, the facility layout data 216 may include geographical coordinates, such as three-dimensional coordinates in space, for physical locations of inventory locations 106 and items 108. In some instance, the facility layout data 216 may also include various types of calibration data to determine whether the sensors and objects in the inventory facility 102 are appropriately placed. For instance, the facility layout data 216 may include indications of locations in the inventory environment 102 that may be used to calibrate the viewing angle of the imaging sensors 112. In one example, a marker on a floor or other place in the inventory facility 102 may be used to calibrate the imaging sensors 112. For instance, if the distance between a marker in the inventory facility 112 and an imaging sensor 112 is a predefined distance, then the imaging sensor 112 may be appropriately calibrated. Alternatively, an imaging sensor 112 or an object in the inventory facility 102 may need to be moved or otherwise calibrated if various positions of objects in the inventory facility 102 do not correspond to data in the facility layout data 216.

In some implementations, the inventory management module 212 may access the physical layout data 216 to determine if a location associated with an event is within the field of view of one or more imaging sensors 112. Continuing the example above, given the location within the inventory facility 102 of an event and the camera data, the inventory management module 212 may determine the imaging sensors 112 that may have generated images of the event.

The data store 214 may further include item data 218 which includes information associated with the items 108. The information may include information indicative of one or more inventory locations 106 at which one or more of the items 108 are stored. The item data 218 may also include order data, SKU or other product identifier, price, quantity on hand, weight, expiration date, images of the item 108, detail description information, ratings, ranking, and so forth. The inventory management module 212 may store information associated with inventory management functions in the item data 218.

The data store 214 may also include sensor data 220. The sensor data 220 comprises information acquired from, or based on, the one or more sensors 204. For example, the sensor data 220 may comprise 3D information about an object in the inventory facility 102. As described above, the sensors 204 may include an imaging sensor 112, which is configured to acquire one or more images. These images may be stored as the image data 222. The image data 222 may comprise information descriptive of a plurality of picture elements or pixels. The sensors may further include non-image data 224 which may comprise information from other sensors 204, such as input from the microphones, weight sensors 114, and so forth.

The data store 214 may also include user data 230, such as identity data, information indicative of a profile, purchase history, location data, images of the user 104, demographic data, and so forth. Individual users 104 or groups of users 104 may selectively provide user data 230 for use by the inventory management system 200. The individual users 104 or groups of users 104 may also authorize collection of the user data 230 during use of the inventory facility 102 or access to user data 230 obtained from other systems. For example, the user 104 may opt-in to collection of the user data 230 to receive enhanced services while using the inventory facility 102. In some examples, the data store 214 may further comprise image gallery data 232, which may include images of the various items 108. The image gallery data 232 may index or store the images of the items such that an item 108 may be associated with its respective image in the image gallery data 232 based on its location in the inventory facility 102 as indicated in the facility layout data 216 and item data 218.

The inventory management module 212 may include a tracking module 226, an identification module 228, an event recognition module 234, and/or an inquiry determination module 238. The tracking module 226 may be configured to track one or more objects associated with the inventory facility 102. For example, the tracking module 226 may access the sensor data 220 to determine location data. The location data provides information indicative of a location of an object, such as the item 108, the user 104, and so forth. The location may be absolute with respect to the inventory facility 102 or relative to another object or point of reference.

The identification module 228 is configured to identify an object. In one implementation, the identification module 228 may be configured to identify an item 108. In another implementation, the identification module 228 may be configured to identify a user 104. For example, the identification module 228 may use facial recognition techniques to process the image data 222 and determine the identity data of the user 104 depicted in the images by comparing the characteristics in the image data 222 with previously stored values. The identification module 228 may also access data from other sensors 204, such as from an RFID reader, an RF receiver, fingerprint sensors, and so forth.

Facial recognition may include analyzing facial characteristics which are indicative of one or more facial features in an image, 3D data, or both. For example, the face of the user 104 may be detected within one or more of the images of the image data 222. The facial features include measurements of, or comparisons between, facial fiducials or ordinal points. The facial features may include eyes, mouth, lips, nose, chin, ears, face width, skin texture, 3D shape of the face, presence of eyeglasses, and so forth.

The event recognition module 234 is configured to process the sensor data 220 and generate output data 244. The event determination module 234 may access information stored in the data store 214 such as event data 236. The event data 236 comprises information indicative of one or more events. For example, the event data 236 may comprise predefined profiles that designate movement of an item 108 from an inventory location 106 with an event of "take". The event data 236 may be manually generated or automatically generated. The event data 236 may include data indicative of triggers associated with events occurring in the inventory facility 102. An event may be determined as occurring upon detection of the trigger. For example, sensor data 220 such as a change in weight from a weight sensor 114 at an inventory location 106 may trigger detection of an event of an item 108 being added or removed from the inventory location 106. In another example, the trigger may comprise an image of the user 104 reaching a hand toward the inventory location 106. In yet another example, the trigger may comprise two or more users 104 approaching to within a threshold distance of one another.

The event recognition module 234 may process the sensor data 220 using one or more techniques including, but not limited to, artificial neural networks, classifiers, decision trees, support vector machines, Bayesian networks, and so forth. For example, the event recognition module 234 may use a decision tree to determine occurrence of the "take" event or "return" event based on sensor data 220. The event recognition module 234 may further use the sensor data 220 to determine one or more tentative values. The one or more tentative values comprise data associated with the event. For example, where the event comprises a disambiguation of users 104, the tentative values may comprise a list of possible user 104 identities. In another example, where the event comprises a disambiguation between items 108, the tentative values may comprise a list of possible item identifiers. In some implementations, the tentative value may indicate the possible action. For example, the action may comprise the user 104 taking, return, moving an item 108, damaging an item 108, providing gestural input, and so forth.

In some implementations, the tentative values may be generated by other modules. For example, the tentative values such as one or more possible identities or locations of the user 104 involved in the event may be generated by the tracking module 226. In another example, the tentative values such as possible items 108 that may have been involved in the event may be generated by the identification module 228.

The event recognition module 234 may be configured to provide a confidence level metric associated with the determination of the tentative values. The confidence level metric provides indicia as to the expected level of accuracy of the tentative value. For example, a low confidence level metric may indicate that the tentative value has a low probability of corresponding to the actual circumstances of the event. In comparison, a high confidence level metric may indicate that the tentative value has a high probability of corresponding to the actual circumstances of the event.

In some implementations, the tentative values having confidence level metrics that exceed the threshold value may be deemed to be sufficiently accurate and thus may be used as the output data 244. For example, the event recognition module 234 may designate the "take" event as involving item 108 and output data 244 reflecting this take event.

In some examples, the event recognition module 234 determines that the confidence level metric associated with the tentative value is below a threshold value, and the inquiry determination module 238 is utilized to provide an inquiry to an associate regarding the event.

The inquiry determination module 238 may be configured to use at least a portion of the sensor data 220 associated with the event to generate inquiry data 240. In some implementations, the inquiry data 240 may include one or more of the tentative values or supplemental image data 248. The inquiry determination module 238 may be configured to provide inquiry data 240 to one or more client computing devices associated with one or more human associates, such as associate computing device 124.

An associate interface 122 is presented on the respective devices of associates (e.g., associate computing device 124). The associate 120 may generate response data 254 by selecting a particular tentative value, entering new information, indicating that they are unable to answer the inquiry, and so forth. The associate user interface is discussed in more detail below in FIGS. 3-7.

The supplemental image data 248 comprises information associated with the event or that may be useful in interpreting the sensor data 220. For example, the supplemental image data 248 may comprise previously stored images of the items 108. In another example, the supplemental image data 248 may comprise one or more graphical overlays. For example, the graphical overlays may comprise graphical user interface elements such as overlays depicting an item of interest. These overlays may comprise highlights, bounding boxes, arrows, and so forth, that have been superimposed or placed atop the image data 222 during presentation to an associate 120.

In one example, a shape of an item 108 with the event may be determined in the image data 222. Once the shape has been determined, data specifying coordinates of a bounding box configured to encompass the edges of the object may be determined. For example, the coordinates for opposite corners of the bounding box may be designated as the pixels on the edge that are closets and farthest from an origin point in the image. The bounding box thus encompasses or surrounds the edges of the item 108. The supplemental image data 248 may include the coordinates. The associate interface 122 may then use these coordinates to render the bounding box on the associate computing device 124. In another implementation, the supplemental image data 248 may be used to modify the portion of the image data 222 prior to delivery to the associate computing device 124. For example, the bounding box may be rendered and incorporated into the image data 222 prior to delivery to the associate computing device 124.

The inquiry determination module 238 is configured to generate the output data 244 based at least in part on the response data 254. For example, given that a majority of the associates' returned response data 254 indicating that the item 108 associated with the "take" event, the output data may indicate that the particular item 108 was taken.

The inquiry determination module 238 may be configured to provide inquiries to particular associates 120. For example, some associates may be better suited to answering particular types of inquiries, or have particular training for answering particular types of inquiries. The determination of the set of associates to use may further be based at least in part on performance data for the associates 120.

By using the inquiry determination module 238, the event recognition module 234 may be able to provide high reliability output data 244 that accurately represents the event. The output data 244 generated by the inquiry determination module 238 from the response data 254 may also be used to further train the automated systems used by the inventory management module 212. For example, the sensor data 220 and the output data 244, based on response data 254, may be provided to one or more of the modules of the inventory management system 212 for training in process improvement. Continuing the example, this information may be provided to the inventory management module 212 to further train these systems such that the confidence level metric and the tentative values produced in the future for the same or similar input is improved.

In some examples, the response data 254 may include responses provided by multiple associates 120, such as a group of three associates. The escalation module 250 may analyze the response data and determine that various triggers exist which require an escalation to an escalation associate. For example, if the response data 254 indicates that there is any disagreement between the associates which provided the response data 254 for the event, the escalation module 250 may determine to escalate the event inquiry to an escalator associate. The escalator associate is similarly provided with the inquiry data 240 and determines a response to the event. The escalation associate may further be provided with the response data 254 for the multiple associates who provided answers for the inquiry to see where the differences exist. The escalator associate may then provide a response to the escalated inquiry data 240 which indicates what occurred during the event.

In various examples, the inventory management module 212 may include a session review module 256 which determines whether another escalator associate is required to review an entire session of a user 104. For example, if the first escalator associate was unable to accurately determine an answer or response to the escalated inquiry provided by the escalation module 250, then a second escalator associate may review an entire session of a user 104 to determine what the user 104 did while in the inventory facility 102. For example, the session review module 256 may use sensor data, user data, event data, inquiry data, supplemental image data, and response data to generate a session review for the second escalator associate. The session review module 256 may employ a user interface generation module 258 to generate a session review interface for a second escalator associate to review and provide input for to provide an answer as to what happened for the particular event.

In various examples, the user interface generation module 258 may interface with other modules, such as the event recognition module 234, the inquiry determination module 238, the supplemental image data generation module 246, the escalation module 250, and/or the session review module 256 and provide user interface data 252 to an associate computing device 124 to present a user interface and receive input from an associate 120.

The inventory management system 200 may further comprise one or more input devices 256, such as a keyboard, a mouse, buttons, a microphone, a touch screen, or any other type of input device to receive input from an associate 120. Further the inventory management system 200 may include one or more output devices 258, such as a display a speaker, or any other type of output device to present or output information to an associate 120.

The one or more processors 202 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program modules, program data, and/or one or more operating systems.

The computer-readable media 206 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 206 may be implemented as computer-readable storage media ("CRSM"), which may be any available physical media accessible by the processor(s) 202 to execute instructions stored on the memory 206. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 202.

Figure 3:
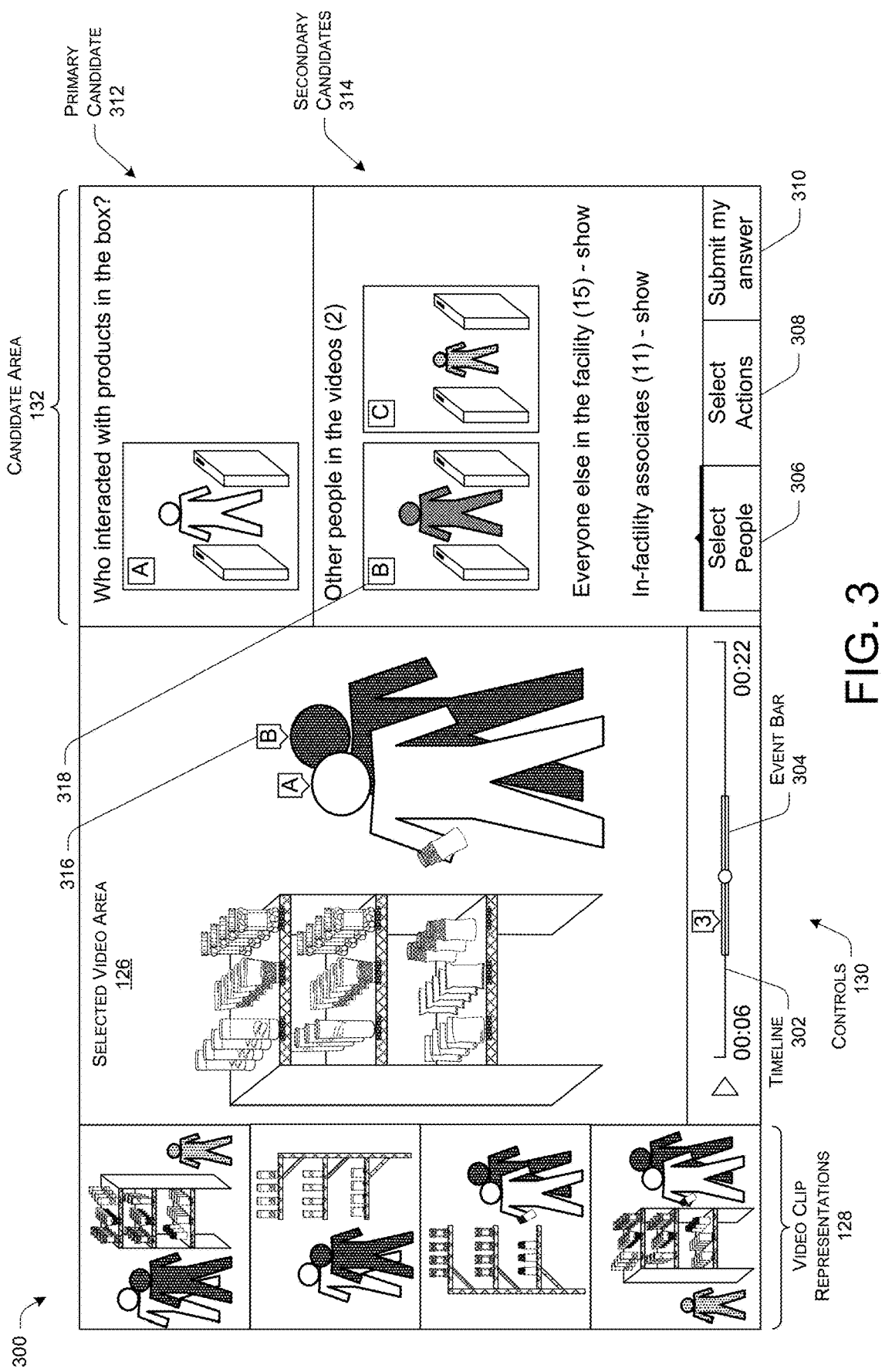
FIG. 3 shows an example user interface (UI) that presents sensor data collected for an inventory facility, and receives input identifying a user who interacted with an item in the inventory facility.

FIG. 3 shows an example user interface (UI) 300, such as associate interface 122, that presents sensor data collected for an inventory facility 102, and receives input identifying a user who interacted with an item in the inventory facility 102. As shown in FIG. 3, the selected video area 126 may present video data from the sensor data 220. The video may be provided in the inquiry data 240 and depict a location of the inventory facility 102 for a period of time during which an event occurred or is deemed based on the sensor data to have possibly occurred. The UI 300 further includes various video clip representations 128, which provide visual representations (e.g., thumbnails, textual descriptions, pictures, images, icons, etc.) of the content contained in each of the video clips. In some instances, the video clip representations 128 may depict the same location for the same or similar period of time as the video presented in the selected video area 126, but from different angles and viewpoints taken by different imaging sensors 112. In some instances, the event recognition module 234 may determine which video in the inquiry data 240 provides the best angle to view the event. For example, the event recognition module 234 may analyze each of the video clips and determine which video clip provides the best viewing angle of a position of an item 108 interacted with during the event. The video clip initially presented in the selected video area 126 may correspond to the video clip determined to have the best viewing angle by the event recognition module 234.

The UI 300 may further provide various controls 130, such as a timeline 302 and an event bar 304. The timeline 302 may represent the entire period of time of the video data that depict the event in the inventory facility 102. The timeline 302 may be selectable or otherwise interacted with to skip around to different portions of the video presented in the selected video area 126. The event bar 304 may comprise a bar that is graphically overlaid on the timeline 302. The first end and second end of the event bar 304 may generally correspond to points in time at which the weight sensors 114 detect changes for an item 108, potentially with a buffer added onto either end. For example, the first end of the event bar 304 may be associated with a first time in the video that is several second prior to a time at which a weight sensor 114 detects a change in weight, such as a take or return of an item 108. The second end of the event bar 304 may be associated with a second time in the video that is several seconds after a time at which no weight changes have been detected by a weight sensor 114 for an object 108 depicted in the video for a threshold amount of time. Thus, the event bar indicates to an associate 120 when an item 108 is being taken, returned, or otherwise interacted with on a weight sensor 114 and that the associate 120 should pay particular attention during this period of time. In some examples, the added buffer may be provides additional time for the associate to turn their gaze to item 108 locations or user 104 locations.

The UI 300 may further include various controls (e.g., tabs) that, when selected, cause various interfaces to be presented in the candidate area 132. As discussed herein, with reference to the various UI's of this application, "presenting" on a display may include sending data to the display be presented in various portions of the display, wherein the display causes the data to be presented (e.g., renders the data when received). Thus, when a UI is being "presented" on a display described herein, various operations may be included in the presentation of the data, such as sending data representing the UI to the display, and the display rendering the data to present the UI on the display. In some examples, the UI 300 includes a user-selection control 306, an item-selection control 308, and a submit-answer control 310. As described herein, a user "selecting" a control may comprise any type of input received from a user that interacts with the control. For example, the input may comprise receiving input from an input device (e.g., mouse, keyboard, etc.) that indicates an interaction with a control, a touch through a touch screen, etc. The candidate area 132 generally presents candidates (e.g., items 108, users 104, etc.) that an associate is to select from to provide input regarding details of the event in the inquiry, and a textual prompt requesting that the associate 120 identify who interacted with products or items shown in the video. For example, when the select customers control 306 is selected, user images (e.g., customer images) are presented in the candidate area 132 for user A, user B, and user C. The identification module 228 may have identified each of user A, user B, and user C as being in the video clips at least for a portion of the period of time. In some examples, the candidate area 132 may present a primary candidate 312 and secondary candidates 314. The event recognition module 234 may have determined that the most likely candidate, or user 104, that caused the event for the inquiry is user A, and determined to present the image of user A in the primary candidate area 312. User B and user C may have been identified in the video, but were not determined to have as high of a degree of certainty as performing the interaction of the event as user A. Thus, the images of user B and user C are shown in the secondary candidates. The candidate area 132 may further include drop down operations to show everyone else in the store, as well as the in-store associates 120.

In some examples, the supplemental image data 248 may be used to further help identify to the associate 120 viewing the inquiry determine which user in the selected video area 126 corresponds to the user images in the candidate area 132. For example, a user identifier 316 may be graphically overlaid on the video in the selected video area 126 to shown user B in the video, and a corresponding user identifier 318 may be presented with the image of user B in the candidate area 132 to help the associate 120 determine which user 104 performed the interaction of the event in the inquiry. Although the user identifiers 316 and 318 are illustrated as letters, the user identifiers 316 and 318 may comprise any type of identifier, such as a numeral, a symbol, an icon, a picture, an image, text, or any other type of graphical indicator. After the associate 120 has determined which user 108 was involved with the event in question, the associate 120 may select the item-selection control 308.

Figure 4:
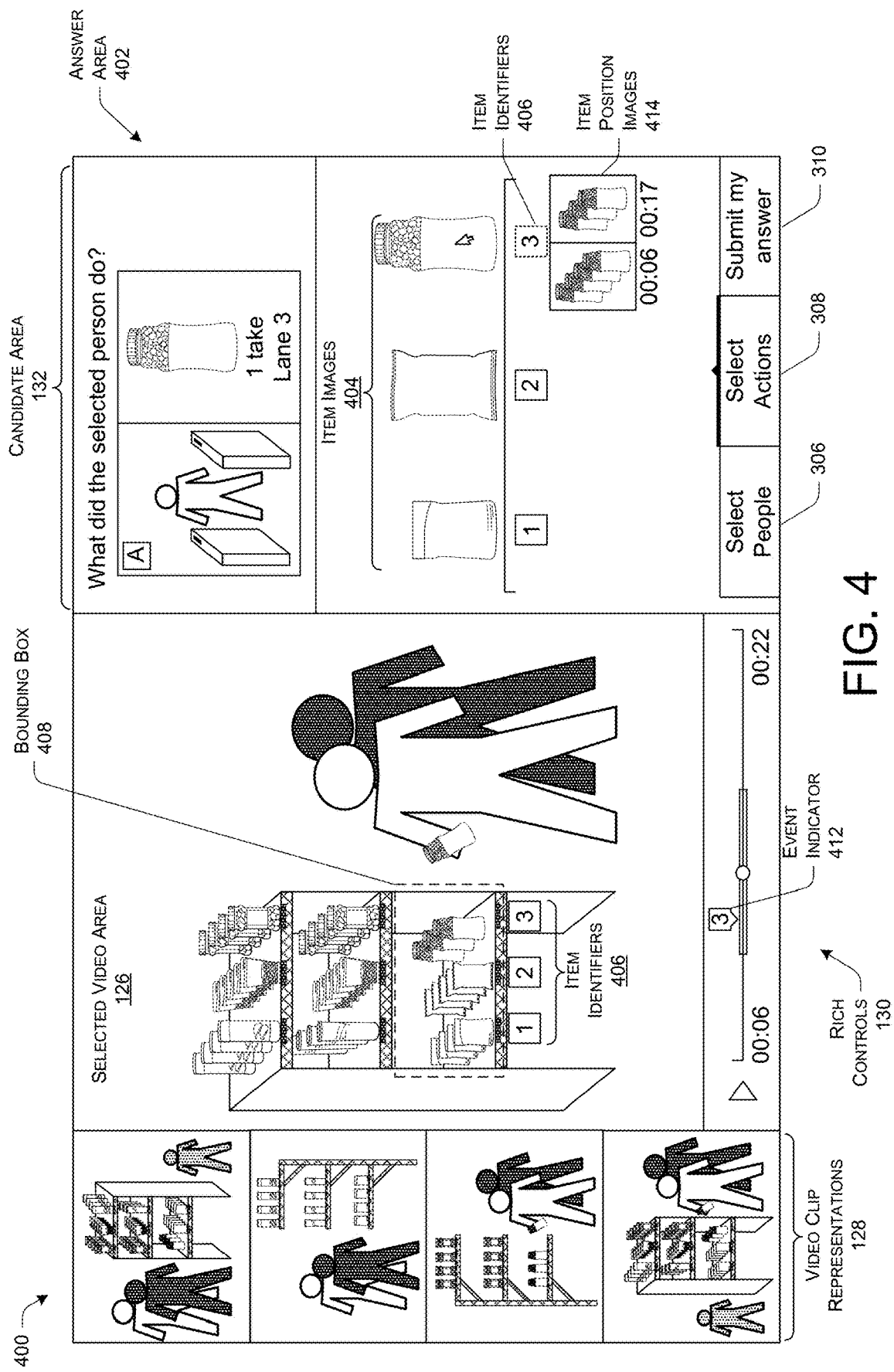
FIG. 4 shows an example UI that presents sensor data collected for an inventory facility, and receives input identifying an item interacted with by an identified user in the inventory facility.

FIG. 4 shows an example UI 400 that presents sensor data collected for an inventory facility, and receives input identifying an item interacted with by an identified user in the inventory facility.

As shown in FIG. 4, the item-selection control 308 has been selected by an associate 120 who is reviewing the inquiry. The associate 120 has already selected which user they believe performed the action of the event, which is user A as shown in the answer area 402. The answer area 402 generally floats between the interfaces of the interface presented for the select customers control 306 and the item-selection control 308. In this way, the associate 120 can see the answer thus far in the answer area 402. The answer area 402 in FIG. 4 includes a textual prompt requesting that the associate 120 identify what the selected user A did, or what action they performed, in the video. The candidate area 132 in FIG. 4 presents item images 404 which correspond to items 108 depicted in the selected video area 126. As shown in the selected video area 126, graphical indicators from the supplemental image data 248 are overlaid on the video being presented. For example, item identifiers 406 are presented at locations of items 108 depicted in the video. For example, the numerals "1", "2", and "3" are presented below locations of three items 108 depicted in the video. The item identifiers 406 may be graphically overlaid on the video based on the sensor data 220 indicating that an item on this shelf was interacted with. The item identifiers 406 may similarly be presented in the candidate area 132 to help the associate 120 identify which item image 404 corresponds to the items in the video of the selected video area 126.

In some examples, the supplemental image data 248 may further include a bounding box 408 which is graphically overlaid in the selected video area 126. The bounding box 408 may define an area in the selected video area 126 that includes the shelf, or other location, determined as having been interacted with in the event of the inquiry. Further, the supplemental image data 248 may include an event indicator 412 adjacent the timeline at a position in time corresponding to the event. The event indicator 412 shown in FIG. 4 comprises a numeral which corresponds to an item identifier 406 in the selected video area 126. The numeral of the event indicator 412 may provide the associate 120 with information regarding which item 108 had its respect weight sensor 114 detect a change in weight. As shown, the item corresponding to item identifier 406 numeral "3" has its respective weight sensor 114 detect a change in weight.

In some examples, when an item image 404 is interacted with (e.g., cursor hovers over the item image 404, item image 404 is selected using the cursor, etc.), then multiple item position images 414 may be presented in the candidate area 132. The item position images 414 may comprise an image of a position at which an item is stored at different points in time. As illustrated, the item position images 414 includes a first image of a location of the item associated with the item identifier 406 numeral "3" taken at a time prior to the time associated with the event indicator 414. Further, the item position images 414 includes a second image of the location of the item associated with the item identifier 406 numeral "3" taken at a time after the time associated with the event indicator 414. The item position images 414 may have been taken by an imaging sensor 112 placed in the inventory location 106 storing the items in the items images 404. In this way, the item position images 414 show the associate 120 what the position of the item looked like before and after the event. As shown in FIG. 4, an item is missing in the later picture that was there in the first picture, which may have led to the associate 120 selecting "1 take" in "lane 3" for the action performed by user A.

Once the associate 120 has determined that the answer area 402 correctly depicts the event as user A performing 1 take of an item in lane 3, the associate 120 may select the submit my answer control 210 and output their answer as response data 254 to the inventory management system 200.

Figure 5:
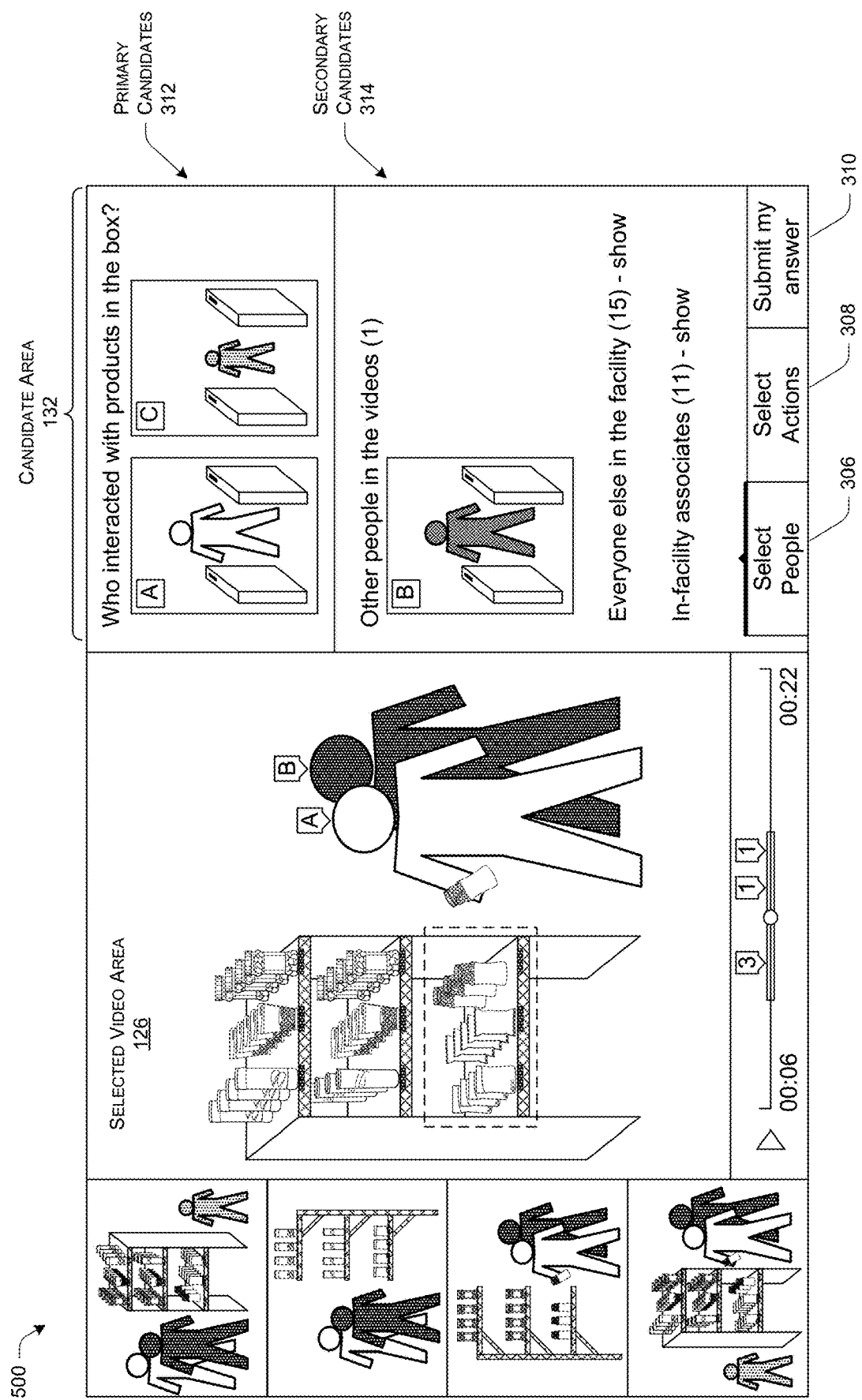
FIG. 5 shows an example UI that presents sensor data collected for an inventory facility, and receives input identifying multiple users who interacted with items in the inventory facility.

FIG. 5 shows an example UI 500 that presents sensor data collected for an inventory facility, and receives input identifying multiple users who interacted with items in the inventory facility. Similar to the example of FIG. 3, the user interface 500 allows an associate 120 to identify users who performed events in the video presented in the selected video area 126. However, rather than only having a single user being selected as performing an action, FIG. 5 illustrates a compound inquiry sent from the inquiry determination module 238 where multiple users performed actions in the video. As shown in FIG. 5, two users (e.g., user A and user C) were identified as being primary candidates 312 by the identification module 228 and the inquiry determination module 238. Thus, the user may select each of the images of the users A and C in the user interface presented when the select customers control 306 is selected. Thus, rather than simply selecting a single user as having performed an event, the associate 120 identifies multiple users.

Figure 6:
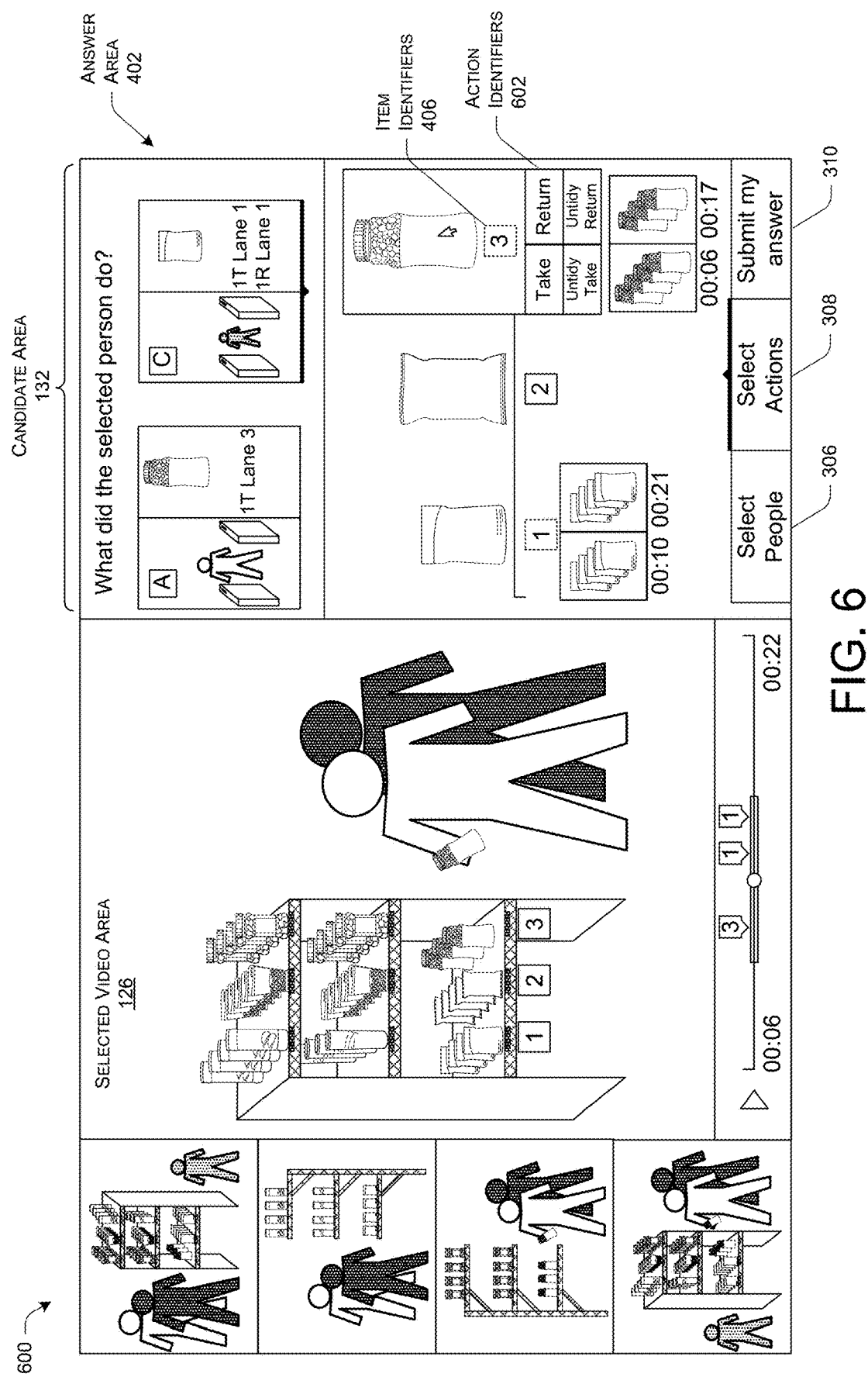
FIG. 6 shows an example UI that presents sensor data collected for an inventory facility, and receives input identifying multiple items interacted with by multiple users in the inventory facility.

FIG. 6 shows an example UI 600 that presents sensor data collected for an inventory facility, and receives input identifying multiple items interacted with by multiple users in the inventory facility. Similar to FIG. 4, FIG. 6 depicts a UI 600 to enable an associate 120 to select items that were interacted with by the identified users A and C. As shown in the answer area 402, the associate 120 has identified that user A took 1 item from lane 3, and that user C took one item from lane 1, but returned 1 item to lane 1. As shown in the candidate area 132, when the associate 120 hovers over or selects the item image corresponding to the item identifier 406 numeral "3", the candidate area 132 may provide action identifiers 602 for the associate 120 to interact with to specify what actions the user C performed with the item. For example, the action identifiers 602 include a "take" option, which is when the user 104 takes an item from an inventory location 106 and a "return" option for when a user 104 returns an item to an inventory location 106. The action identifiers 602 further include "untidy take" and "untidy return" options as well. An "untidy take" may correspond to actions that do not include taking the item shown with the item identifier 406 of numeral "3" from its respective position. For instance, an item other than that shown as being associated with the item identifier 406 of "3" may have been taken from the location, or a user may have bumped the item that is associated with the item identifier 406 of "3" when taking or returning a different item. Similarly, an "untidy return" generally comprises an action other than a normal return of an item to a location that it belongs to. For example, a foreign item may be placed in the position on the inventory location 106 where the item associated with the item identifier 406 is meant to be placed. In some examples, the action identifiers 602 may further include an "unsure" option where an associate can indicate that they are unsure what action was taken by the user. In some examples, this may result in escalation to an escalation associate for resolving what occurred in the video, as described in FIGS. 10-13.

The action identifiers may be selected a number of times corresponding to the actions taken by the user 104. For example, if the user took three items, the associate 120 may simply select the "take" option three times to show in the answer area 402 that the item was taken three times. In some examples, "plus" text or a plus icon (e.g., +) may be presented by or associated with the "take," "return," "untidy take," and "untidy return," action identifiers 602. Once the associate has finished identifying all of the actions performed for all of the items for each of the identified users 104, the associate 120 may select the submit-answer control 310 and output their answer as response data 254 to the inventory management system 200. In various examples, the "controls" describe in this application may comprise any type of method or item for receiving input. For example, the "controls" (e.g., select customers control 306, select actions control 308, submit my answer control 310, etc.) may comprise a button, a tab, a voice control input device, or any other type of input means.

Figure 7:
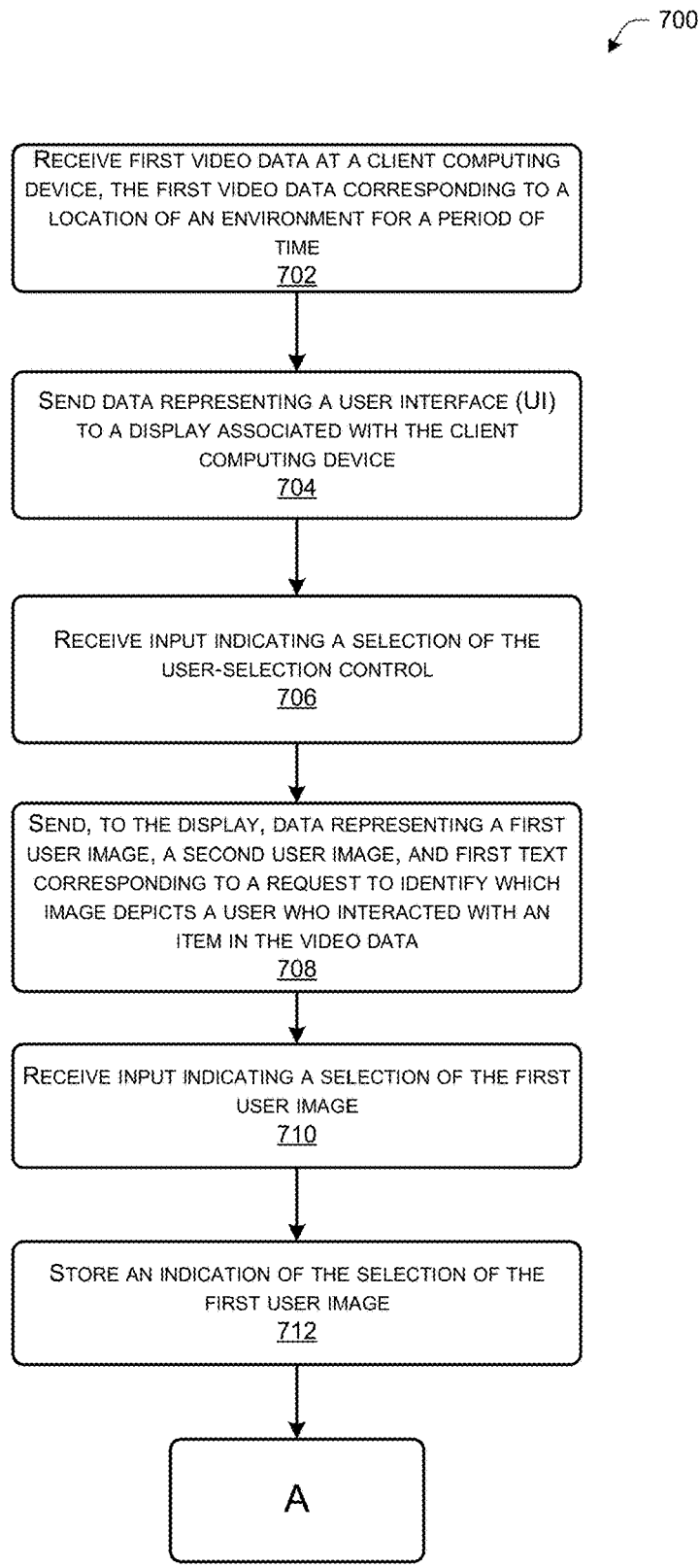
FIG. 7 illustrates a flow diagram of an example process for employing a UI to present information representing sensor data collected for an inventory facility, and receive input from an associate regarding details of a user who interacted with an item in the facility.
Figure 8:
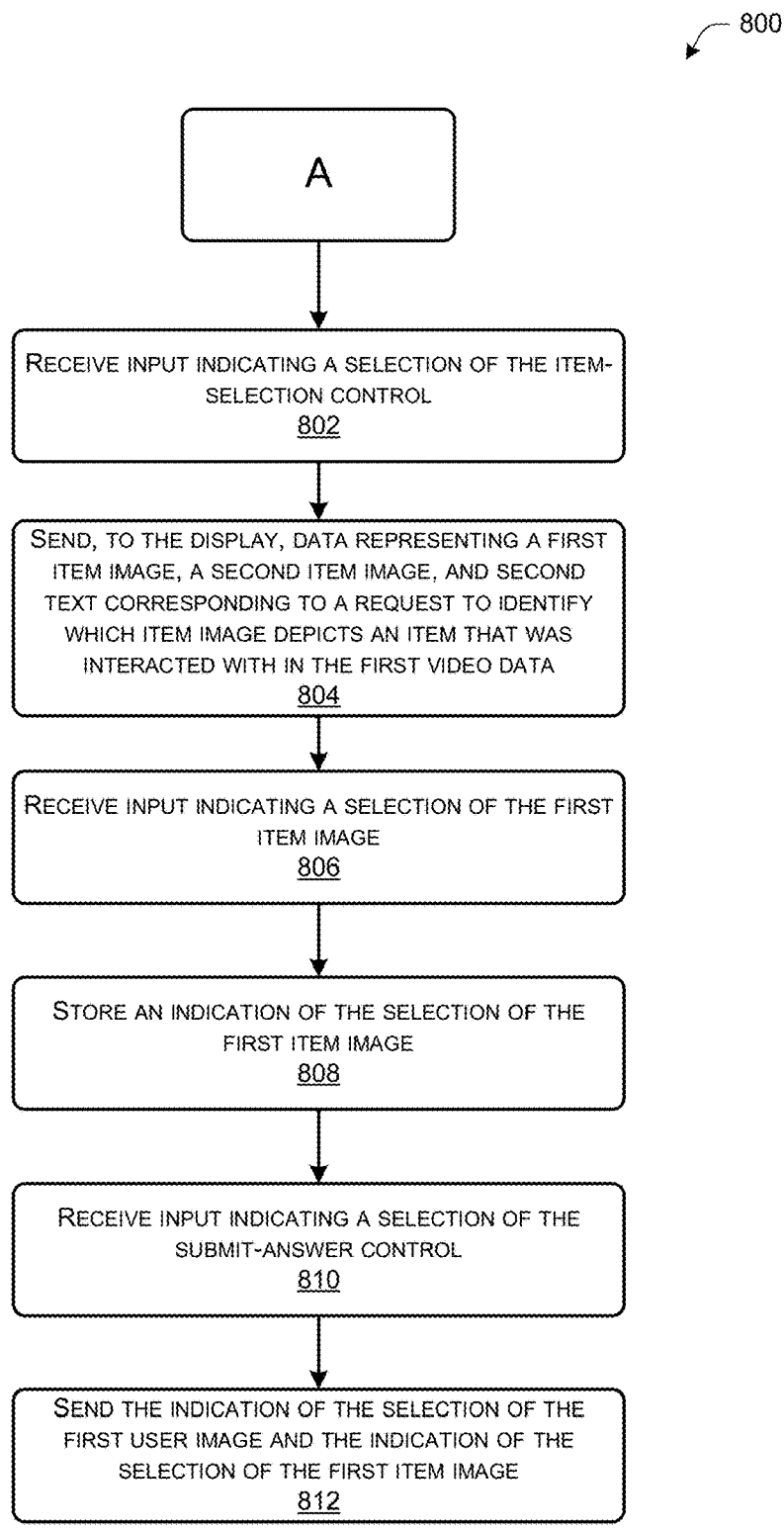
FIG. 8 illustrates a flow diagram of an example process for employing a UI to present information representing sensor data collected for an inventory facility, and receive input from an associate regarding details of an item which was interacted with by a user the facility.

FIGS. 7 and 8 illustrate example processes 700 and 800 for employing a user interface to present information representing sensor data collected for an inventory facility 102, and receive input from an associate regarding details of an event depicted by the sensor data. These processes (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 7 illustrates a flow diagram of an example process 700 for employing a UI to present information representing sensor data collected for an inventory facility, and receive input from an associate regarding details of a user who interacted with an item in the facility.

At 702, a client computing device (e.g., associate computing device 124, etc.) may receive first video data, where the first video data corresponds to a location of an environment for a period of time. In some examples, the first video data may depict a first user at the location for at least a portion of the period of time, a second user at the location for at least a portion of the period of time, a first item at the location for at least a portion of the period of time, and a second item at the location for at least a portion of the period of time.

At 704, the client computing device may send data representing a UI to a display associated with the client computing device. In some examples, the client computing device may be a device associated with the inventory management system 200, while in other examples, the client computing device may comprise the associate computing device 124 which is a stand-alone device from the inventory management system 200. The UI may comprise a first portion in which the first video data is presented, and a second portion, adjacent the first portion, that includes a user-selection control, an item-selection control, and a submit-answer control.

At 706, the client computing device may receive input indicating a selection of the user-selection control. At 708, at least partly in response to receiving the input indicating selection of the user-selection control, the client computing device may send data to the display to be presented in the second portion of the UI, the data representing a first user image corresponding to the first user, a second user image corresponding to the second user, and first text corresponding to a request to identify which image depicts a user who interacted with an item depicted in the video data.

At 710, the client computing device may receive input indicating a selection of the first user image. At 712, the client computing device may store an indication of the selection of the first user image.

In various examples, the inventory management system 200 may have determined with a high degree of certainty which item was interacted with, and only require input regarding which user interacted with the item. In such examples, the process 700 may end and output data including an indication that the first user interacted with the item. In other examples, the inventory management system 200 may also request associate input regarding which item was interacted with by the first user, and move on to step A.

FIG. 8 depicts a process which picks up from step A shown in process 700 of FIG. 7. At 802, the client computing device may receive input indicating a selection of the item-selection control 802.

At 804, the client computing device may send data to the display to be presented in the second portion of the UI and at least partly in response to the receiving the input indicating the selection of the item-selection control, the data representing a first item image corresponding to the first item, a second item image corresponding to the second item, and second text corresponding to a request to identify which item image depicts an item that was interacted with in the first video data.

At 806, the client computing device may receive input indicating a selection of the first item image. At 808, the client computing device may store an indication of the selection of the first item image. At 810, the client computing device may receive input indicating a selection of the submit-answer control.

At 812, the client computing device may send, to one or more server computing devices (e.g., inventory management system 200) and at least partly in response to the receiving the selection of the submit-answer control, the indication of the selection of the first user image and the indication of the selection of the first item image.

Figure 9:
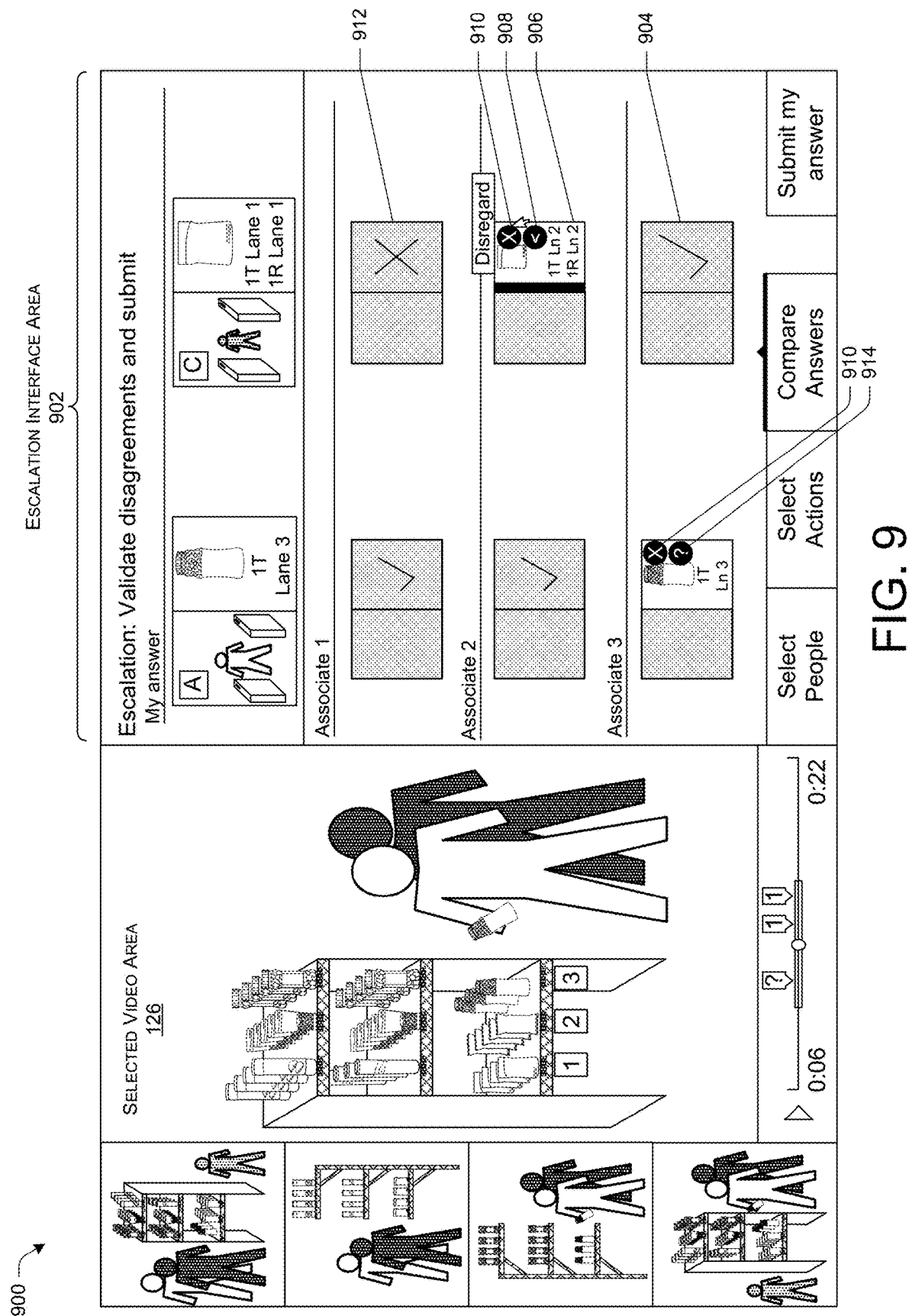
FIG. 9 shows an example UI that presents answers from associates regarding events depicting in videos of an environment, and compares an answer from an escalation associate with the answers from the associates to aid in determining details of the events.

FIG. 9 shows an example UI 900 that presents answers from associates regarding events depicted in videos of an environment, and compares an answer from an escalation associate with the answers from the associates to aid in determining details of the events.

As discussed above, in some examples each inquiry sent from the inquiry determination module 238 may be analyzed by three associates 120, who each provide answers as to what they believe occurred for each event contained in the inquiry data 240. In various instances, various triggers may cause an inquiry to be escalated to an escalator associate. For example, when one or more of the associates disagree with the other associates as to what happened with one of the events in the inquiry, the inquiry may be escalated to the escalator associate. Similarly, if one of the associates is unsure as to what occurred with one of the events in the inquiry, the inquiry may be escalated to the escalator associate.

When an inquiry is escalated to an escalator associate, the escalator associate proceeds through the inquiry steps that each of the three associated went through, such as watching the videos in the selected video area 126, selecting one or more customers who were involved with events in the videos, selecting actions performed by the one or more customers, and submitting the answer. In this way, the escalator associate makes up their own, unbiased determination as to what events occurred in the videos.

Once the escalator associate has come up with their own answer or response to the inquiry data 240 that has been escalated, the escalator associate may then be presented with an escalation interface area 902 which presents the answers from the other three associates and compares them with the escalator associate's answer. The escalation interface area 902 may present the answers from the associates using techniques that highlight the differences between the answers. For example, if the answers provided by the associates are the same as the escalator associate's answers, a check mark indicator 904 may be graphically overlaid on the answers, and the answers may be grayed out, to indicate that these do not need to be reviewed by the escalator associate. Conversely, if the answers provided by an associate differ from the answer provided by the escalator associate, the answers that differ may be presented in the escalation interface area 902, as shown with the item 906.

As shown, the answer provided by the associate 1 and the associate 2 for the event involving the user C is different than the answer provided by the escalator associate and the associate 3. Rather than a "take" and "return" by user C being associate with lane 1, the associate 1 and associate 2 identified user C as having performed a "take" and a "return" with an item of lane 2.

If an answer provided by an associate differs from the answer provided by the escalator associate, one or more controls may be presented on the associate answer which allows the escalator associate to determine how to proceed. A review control 908 may be presented that, when selected, allows the escalator associate to go back to the select-customer and select-action interfaces to determine whether to change their answer for the event involving user C. Additionally, a disregard control 910 is presented that, when selected, disregards the answer of the associate and uses the answer from the escalator associate. When the disregard control 910 is selected, an "X" mark indicator is placed over the associate's answer, as shown with "X" mark indicator 912 for the disregarded answer from associate 1. In this way, an escalator associate can review answers provided by the three associates, and determine which is the correct answer for an event.

The escalation interface area 902 of FIG. 9 further illustrates an example where the associate 3 was unsure about an answer. The associate 3 is still required to enter an answer, but is able to mark an unsure option to escalate the inquiry to an escalator associate. The event for which the associate 3 was unsure includes a question mark control 914 which indicates that the associate was unsure, and a disregard control 910. When the question mark control 914 is selected (e.g., clicked on with an input device), the escalator associate is able to go back and check their answer for the event involving the user A. In some examples, the question mark control 914 may not be click-able or selectable. In such examples, the question mark control 914 may comprise a static graphic which indicates that that the associate was unsure. The question mark control 914 may notify the escalation associate that the associate 3 was unsure, and the escalation associate may decide to review their answer or the video based on the question mark control 914 being presented.

Once the escalator associate has reviewed all of the events that require attention due to different answers provided by associates, or unsure answers provided by associates, each of the answers requiring attention of the escalator associated are associated with either an "X" mark indicator 912 or a check mark indicator 904. The escalator associate can then select the submit-answer control and output response data 254 for the escalation inquiry. In some instances, the answer data provided by the escalator associate is used as the authoritative response regarding the outcome of the event(s). For instance, the virtual shopping cart(s) of the user(s) associated with the event(s) may be updated based on the answer data provided by the escalator associate, rather than other associates (e.g., Associates 1, 2, and 3).

Figure 10:
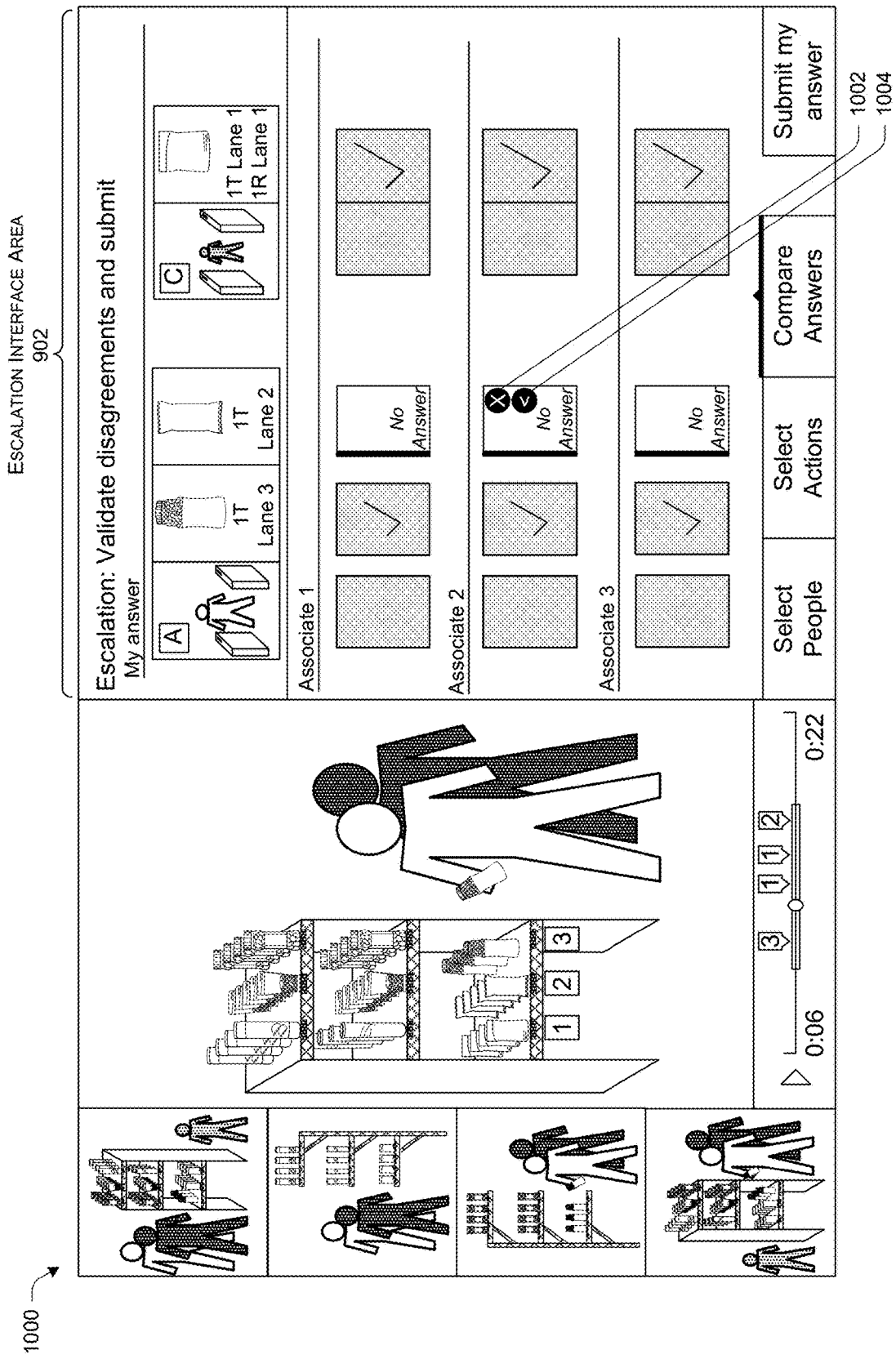
FIG. 10 shows an example UI that presents answers from associates regarding events depicted in videos of an environment, and compares an answer from an escalation associate with the answers from the associates to aid in determining details of the events.

FIG. 10 shows an example UI 1000 that presents answers from associates regarding events depicted in videos of an environment, and compares an answer from an escalation associate with the answers from the associates to aid in determining details of the events.

Similar to FIG. 9, FIG. 10 depicts a comparison between answers provided by three associates and an answer provided by an escalator associate for an inquiry that has been escalated. As shown, the answer provided by the escalator associate includes an extra item that was identified as being interacted with by user A. The escalation interface area 902 illustrates that none of the three associates identified this item as being interacted with by user A. Thus, a disregard control 1002 is presented for the No Answer provided by the associates, and a review control 1004 is provided. If the escalator associate selected the disregard control 1002, the answer provided by the associate 2 is ignored, but if the review control 1004 is selected, the escalator associate goes back to the selection actions interface for the user A to allow the escalator associate to review and/or change their answer if desired. Once the associate has either changed their answer to correspond with the three associates, or has disregarded the three associates answers, the escalator associate can select the submit my answer control and output their response as response data 254 to the inventory management system 200.

Figure 11:
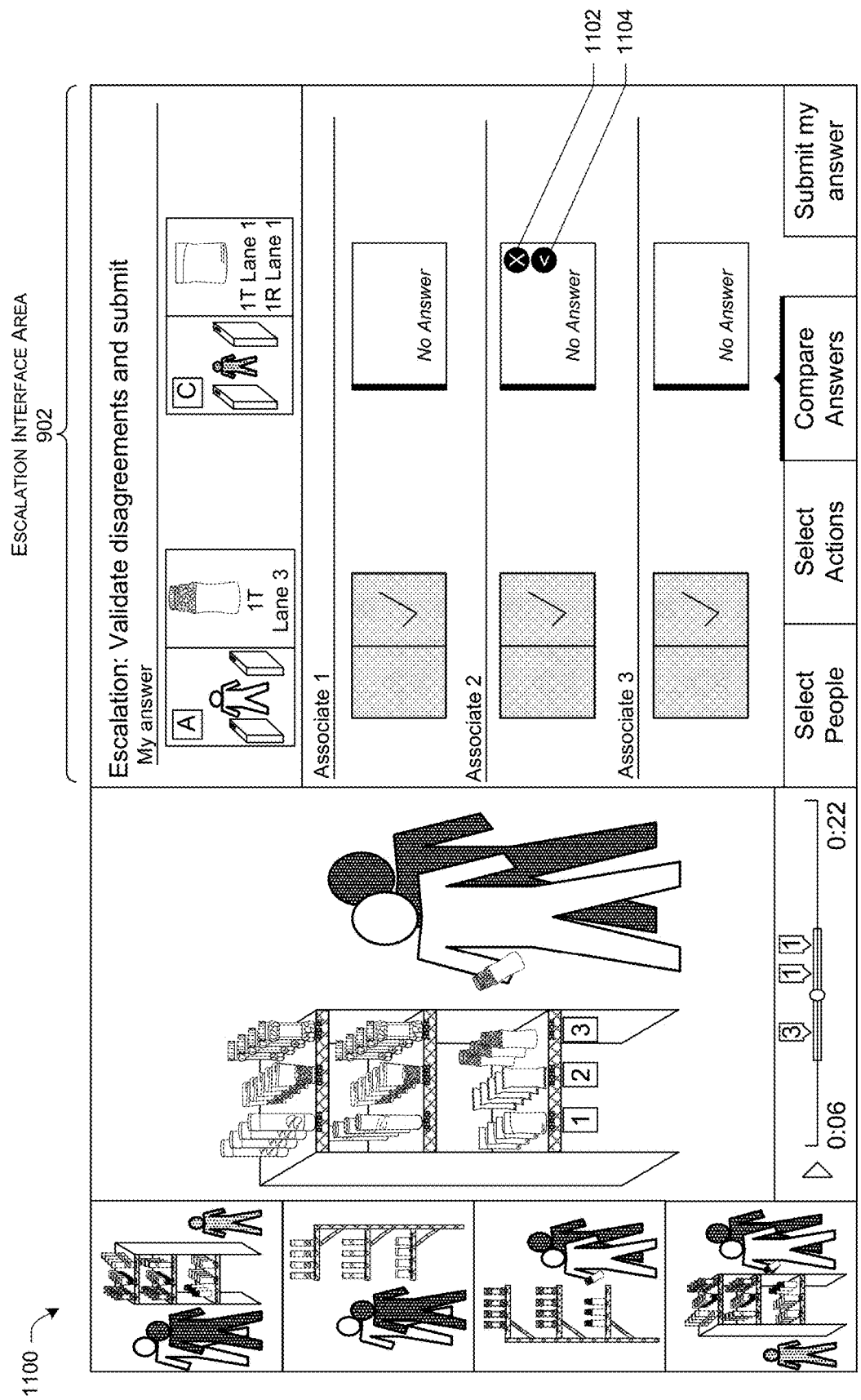
FIG. 11 shows an example UI that presents answers from associates regarding events depicted in videos of an environment, and compares an answer from an escalation associate with the answers from the associates to aid in determining details of the events.

FIG. 11 shows an example UI 1100 that presents answers from associates regarding events depicted in videos of an environment, and compares an answer from an escalation associate with the answers from the associates to aid in determining details of the events. In FIG. 11, the three associates have identified more users as having performed an event during the inquiry at issue.

Similar to the techniques described with respect to FIGS. 9 and 10, the UI 1100 presents differences between the answer of the escalator associate and the three associates' answers. In this case, the three associates all indicated that user C did not perform a take from lane 1 and a return to lane 1, but the escalator associate indicated that user C did perform a take from lane 1 and a return to lane 1. The escalator associate is provided with a disregard control 1102 and a review control 1104 for each answer associate that that differs from the escalator answer. Once the escalator associate has either reviewed their answer and changed their answer to correspond to the associate's answers, or has selected the disregard control for each of the three associates answers, the escalator associate can select the submit my answer control and output response data 254 for the escalated inquiry.

Figure 12:
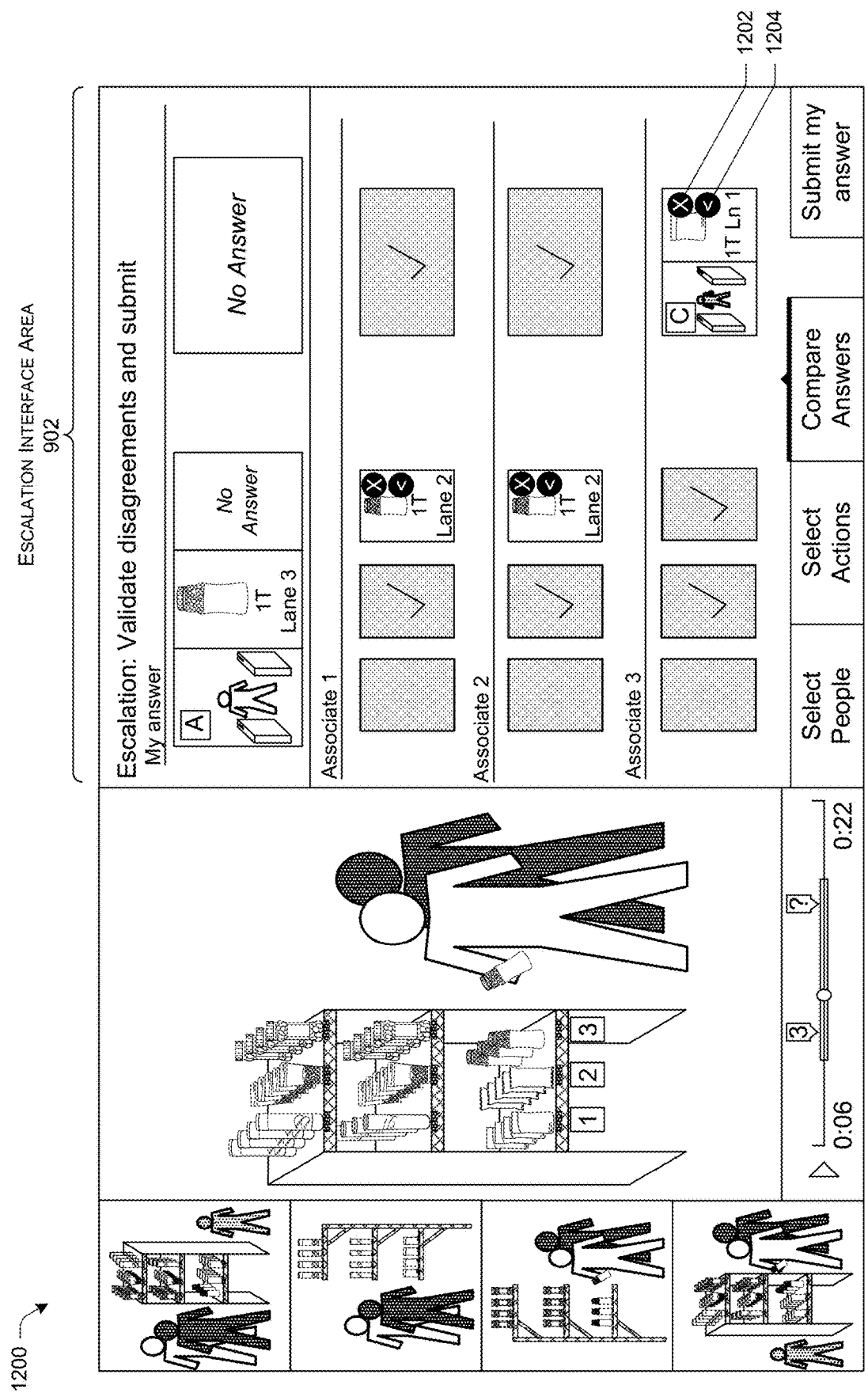
FIG. 12 shows an example UI that presents answers from associates regarding events depicted in videos of an environment, and compares an answer from an escalation associate with the answers from the associates to aid in determining details of the events.

FIG. 12 shows an example UI 1200 that presents answers from associates regarding events depicted in videos of an environment, and compares an answer from an escalation associate with the answers from the associates to aid in determining details of the events. In FIG. 12, the three associates have identified more users as having performed an event during the inquiry at issue, and more items as having been interacted with by an identifier user during the inquiry at issue.

As shown in the escalation interface area 902 of the UI 1200, the escalator answer did not include an answer for an event identified by the first associate and the second associate as having occurred with user A, and also did not provide an answer for an event identified by the third associate as having occurred with user C.

Similar to the techniques described above, the escalator associate may either use a disregard control 1202 for each of the events that differ from the escalator's answer, or select the review control 1204 to go back to review and/or change their answer to be in line with what the associates answered. Once the escalator associate has either disregarded the different answers, or changed the escalator answer to agree with the associates answers, the escalator associate can select the submit my answer control and output response data 254 for the escalated inquiry. In some examples, by "x" for the review control 1204, the user C may be removed from the escalation interface area 902. In such examples, the selection of the review control 1204 may indicate that the escalator associate did not identify the user C as taking an item, as associate 3 identified. Accordingly, the representing of user C performing a take of the item may be removed from the escalation interface area 902.

Figure 13:
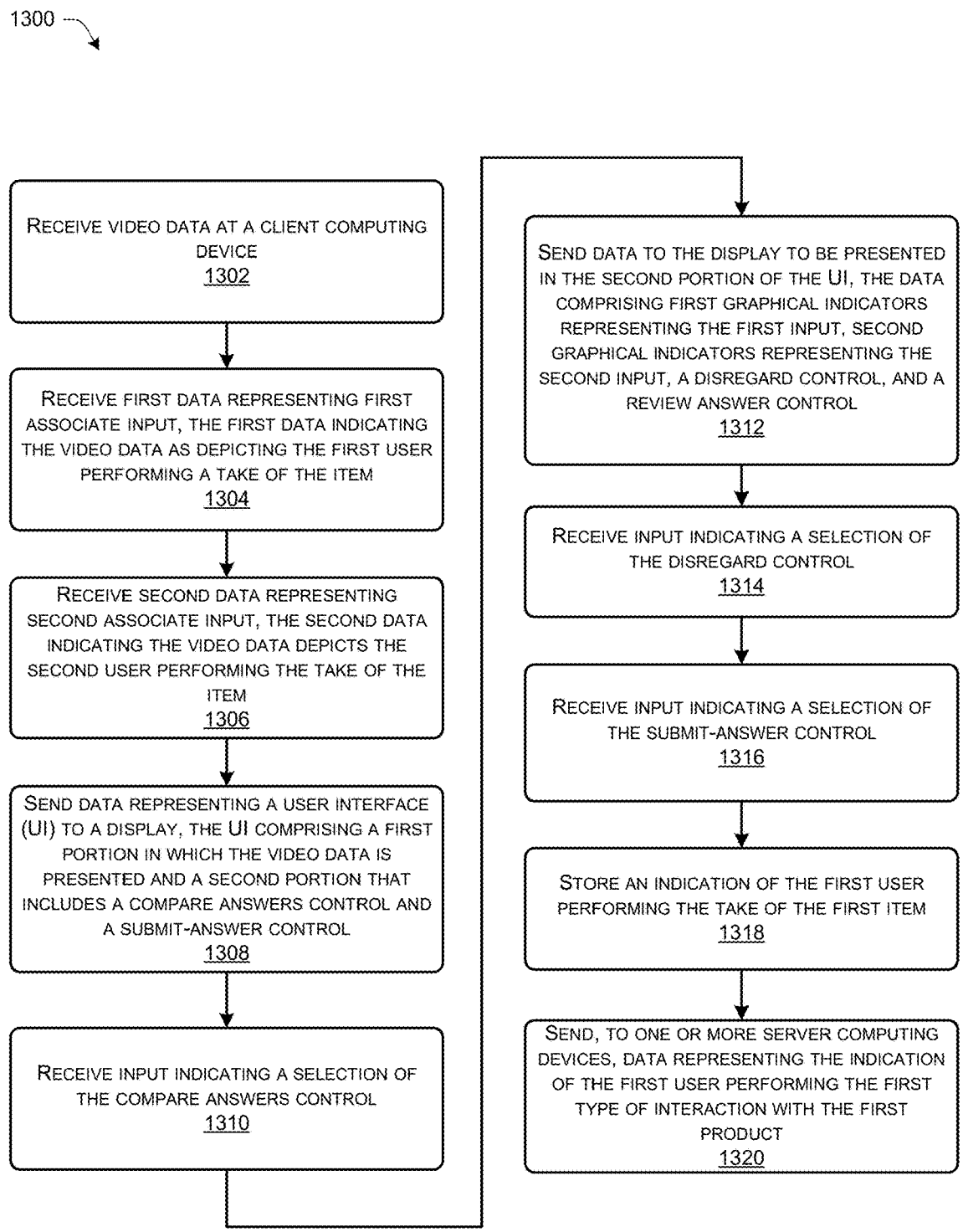
FIG. 13 illustrates a flow diagram of an example process for employing a UI to present answers to an inquiry from three associates, compare the answers, and receive input to resolve differences in the answers.

FIG. 13 illustrates a flow diagram of an example process 1300 for employing a UI to present answers to an inquiry from three associates, compare the answers, and receive input to resolve differences in the answers.

At 1302, a client computing device (e.g., associate computing device 124, etc.) may receive video data corresponding to a location of an environment for a period of time and depicting a first user at the location for at least a portion of the period of time, a second user at the location for at least a portion of the period of time, and an item at the location for at least a portion of the period of time.

At 1304, the client computing device may receive first data representing first associate input, the first data indicating the video data depicts the first user performing a take of the item.

At 1306, the client computing device may receive second data representing second associate input, the second data indicating the video data depicts the second user performing the take of the item.

At 1308, the client computing device may send data representing a user interface (UI) to a display associated with the client computing device. The UI may comprise a first portion in which the video data is presented, and a second portion, adjacent the first portion, that includes a compare answers control and a submit-answer control.

At 1310, the client computing device may receive input indicating a selection of the compare answers control.

At 1312, the client computing device may send, at least partly in response to receiving the selection of the compare-answers control, data to the display to be presented in the second portion of the UI, the data representing first graphical indicators representing the first data, the first graphical indicators including a first user image depicting the first user, a first item image depicting the first item, and text indicating the first type of interaction; second graphical indicators representing the second data, the second graphical indicators including a second user image depicting the second user, the first item image depicting the first item, and the text indicating the first type of interaction; a disregard control associated with the second user image depicting the second user; and a review answer control associated with the second user image depicting the second user.

At 1314, the client computing device may receive input indicating a selection of the disregard control. At 1316, the client computing device may receive input indicating a selection of the submit-answer control. At 1318, the client computing device may store an indication of the first user performing the first type of interaction with the first item.

At 1320, the client computing device may send, to one or more server computing devices, data representing the indication of the first user performing the first type of interaction with the first item.

Figure 14:
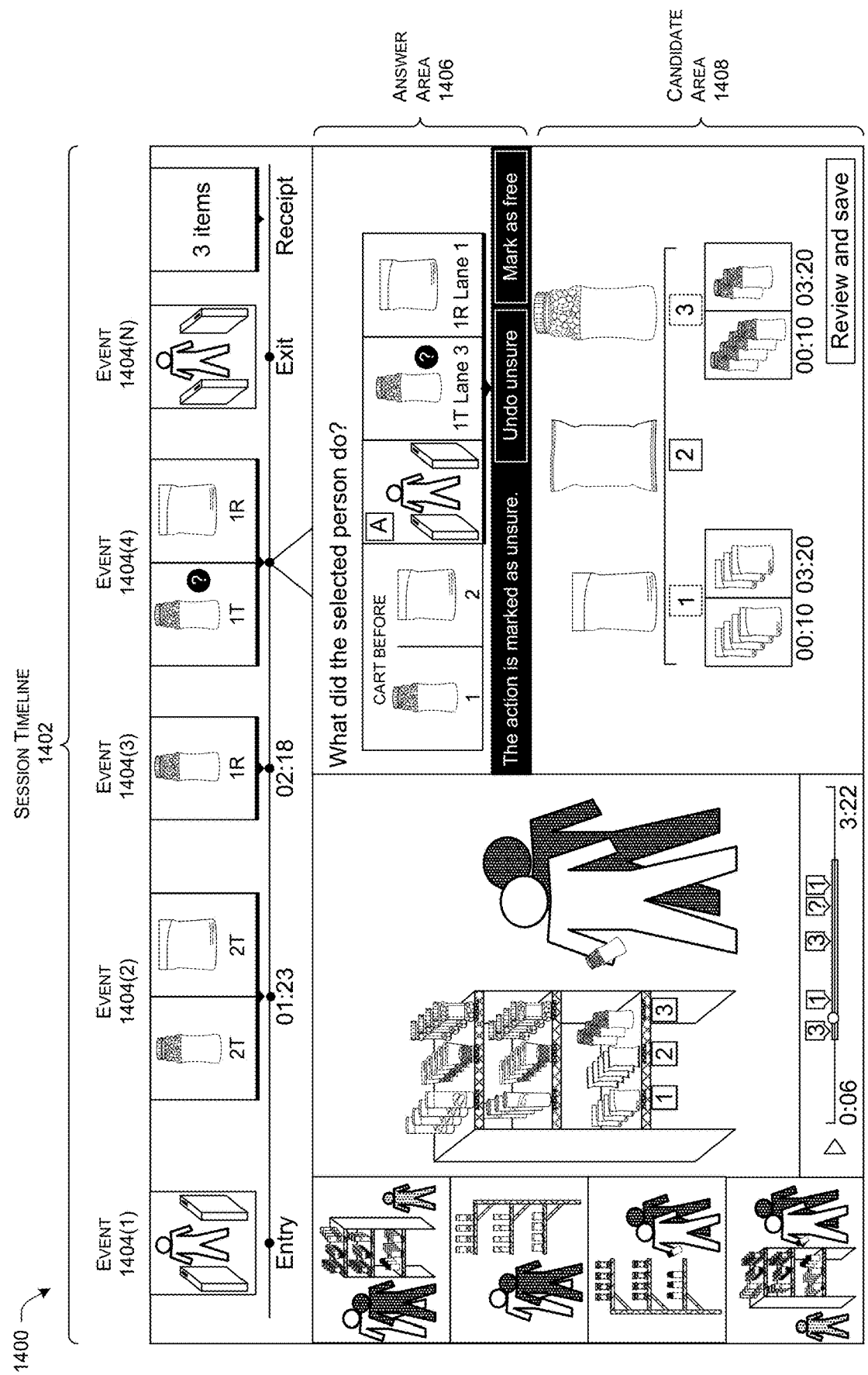
FIG. 14 shows an example UI that presents a timeline representing a session of a user in an inventory facility, and receives input confirming or modifying events of the shopping session.

FIG. 14 shows an example UI 1400 that presents a timeline representing a session of a user in an inventory facility, and receives input confirming or modifying events of the shopping session. FIG. 14 illustrates a scenario where an associate was unsure about what occurred for a particular event in the session.

Figure 15:
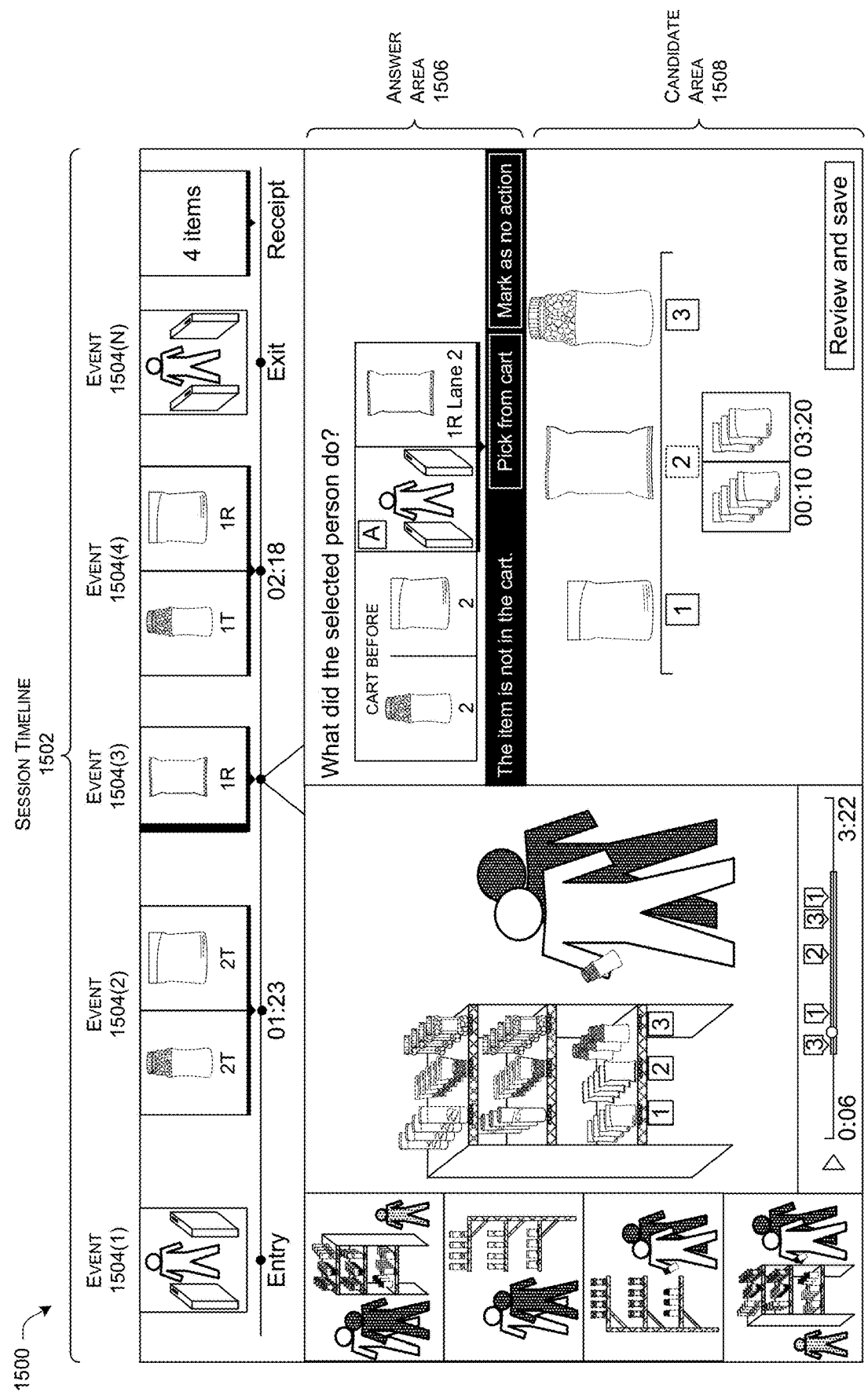
FIG. 15 shows an example UI that presents a timeline representing a session of a user in an inventory facility, and receives input confirming or modifying events of the shopping session.

FIG. 14 generally represents a session review example. A session review may include a review of an entire session of a customer or user. Various events or triggers may cause the session review module 256 to trigger the session review, such as the initial associate being unsure about what events occurred in the video as shown in FIG. 14. Other examples for triggering the session review may include (as shown in FIG. 15 in more detail) a return of an item that had not been identified as previously been taken by the user, or when an associate notices something worth flagging (e.g., the user behaving oddly by items, a user swapping items around on shelves, etc.). In some examples, the associate computing device 124, or another device accessible by an associate, may include a menu, such as a drop-down menu, that presents options for the associate to flag a session of a user for review. In some examples, the drop-down menu may be presented to an associate upon hovering over certain images presented on the display. For example, an escalation associate may hover a cursor over the disregard control 1102 depicted in FIG. 11, which may present the drop-down menu for the escalation associate to flag the session of a user for session review. In some examples, the escalation associate may hover a cursor over an image, which indicates that the image is bad and escalated the session for session review, and escalates the session of the user to get a new picture from the video.

In a session review, the user interface generation module 258 may generate a UI, such as UI 1400, that presents data depicting each event involving a customer or customers and ma request input for one or more of the events. The UI 1400 may allow the escalator associate to view each event in the customer session to modify or confirm each event. In this way, the escalator associate can view all of the behaviors of the customer and determine, in the context of the entire shopping session, what happened at each event. Once the escalator associate confirms or modifies each event in the session, the escalator associate may save their final session answer which is output to the inventory management system. In this way, inquiries, which were unable to be resolved by three associates and a first escalator, may be determined by a second escalator associate in the context of the entire customer session.

As shown in the UI 1400 of FIG. 4, a session timeline 1402 may be presented in a portion of the UI 1400, such as a top portion. The session timeline 1402 may generally depict various events 1404 (e.g., 1404(1), 1404(2), . . . 1404(N)) that occurred during a session of a user. An event 1404(1) may correspond to when the user entered the environment, and the event 1404(N) may correspond to when the user exited the environment. The other various events 1404 may correspond to interactions performed by the user with items in the environment, such as taking an item from a position in the environment and returning an item to a position in an environment.

In some examples, the UI 1400 includes an answer area 1406 which depicts an answer for an event. In the example of FIG. 4, the event 1404(4) is illustrated because an initial associate was unsure whether the selected person, which is user A in this example, performed the action of taking one item (e.g., can of nuts) from lane 3. The initial associate may select what they believe occurred (i.e., the take of the nuts from lane 3), but indicate that they are unsure as shown with the question mark in the answer area 1406. The answer area 1406 may additionally present a representation of what the "cart" for the user A looked like before the event 1404(4), or what items the user A had taken and kept with them during the session. In some examples, this may help the escalator associate determine whether or not an item could be returned by determining whether the user A had the item in their cart. The answer area 1406 may include multiple controls, such as a control to confirm the initial associate's answer (e.g., an "undo unsure" control), and a control to disconfirm the initial associate's answer (e.g., a "mark as free" control). The escalator associate may select one of the controls in the answer area 1406 to either confirm or disconfirm the initial associate's answer. The escalator associate may further be provided with additional information to help in this determination, such as video data shown in the left portion of the UI 1400 and as described previously. Additionally, the UI 1400 may include a candidate area 1408 which illustrates potential items, or "candidates," that user A may have interacted with (e.g., item 1, item 2, and item 3). Upon selecting, hovering, or otherwise interacting with the images of the items in the candidate area 1408, pictures of locations of those items in the environment may be presented which show what the position looked like for each respective item before and after the event in question. In this way, the escalator associate may further be apprised with information to determine what occurred at event 1404(4).

Once the escalator associate has either confirmed or disconfirmed the initial associate's answer for event 1404 (4), the escalator associate may select the review and save control shown in candidate area 1408, which saves an indication of the escalator associate's answer for the various events 1404. In some examples, the escalation to an associate prior to the session review may not affect the session review. Stated otherwise, the session review may take precedent over the "answers" provided in an escalation.

FIG. 15 shows an example UI 1500 that presents a timeline representing a session of a user in an inventory facility, and receives input confirming or modifying events of the shopping session. FIG. 15 illustrates a scenario where an item is identified as being returned to a location by a user, but was never originally identified as being taken from the location by the user.

Similar to the UI 1400 described in FIG. 4, the UI 1500 includes a session timeline 1502 depicting various events 1504 of a session for a user, such as user A. Additionally, the UI 1500 includes an answer area 1506 which depicts an answer of the escalator associate performing the session review and a cart for the user A which shows what the user A had selected prior to the event in question. As shown in the answer area 1506, event 1504(3) was flagged for session review because the item (e.g., a bag of chips) that was identified as being returned to lane 2 was not previously in the cart before. Thus, it is unclear how the item could be returned when user A was not identified as having previously taken the item. In such examples, it is advantageous to review an entire session of the user A to determine when or if the user A took the item that was identified as being returned at event 1504(3), or if a different item was returned at 1504(3).

The "cart before" shown in the answer area 1506 shows that the user A was determined to have taken two jars of nuts and two bags of a particular bag of chips, but at event 1504(3), the user A was identified as returning one bag of a different type of chip that the user A had not been identified as having with them. The answer area 1506 may present various controls, such as a confirm control (e.g., "pick from cart" control) which confirms the return of event 1504(3) by removing the bag of chips from the cart, or a disconfirm control (e.g., "mark as not action" control) which removes the event 1504(3) by marking no action as having occurred at event 1504(3). In some examples, by selection the "pick from cart control," the control may take the escalator associate to a cart of the user A to allow the escalator associate to take the particular item from the cart.

Similar to the UI 1400 of FIG. 14, the candidate area 1508 of the UI 1500 presents candidate items, as well as additional information (e.g., images of the position of the candidate items in the environment) to help the escalator associate determine what occurred for each event 1504. Once the escalator associate has either confirmed or disconfirmed the initial associate's answer for event 1504(3), the escalator associate may select the review and save control shown in candidate area 1508, which saves an indication of the escalator associate's answer for the various events 1504.

Figure 16:
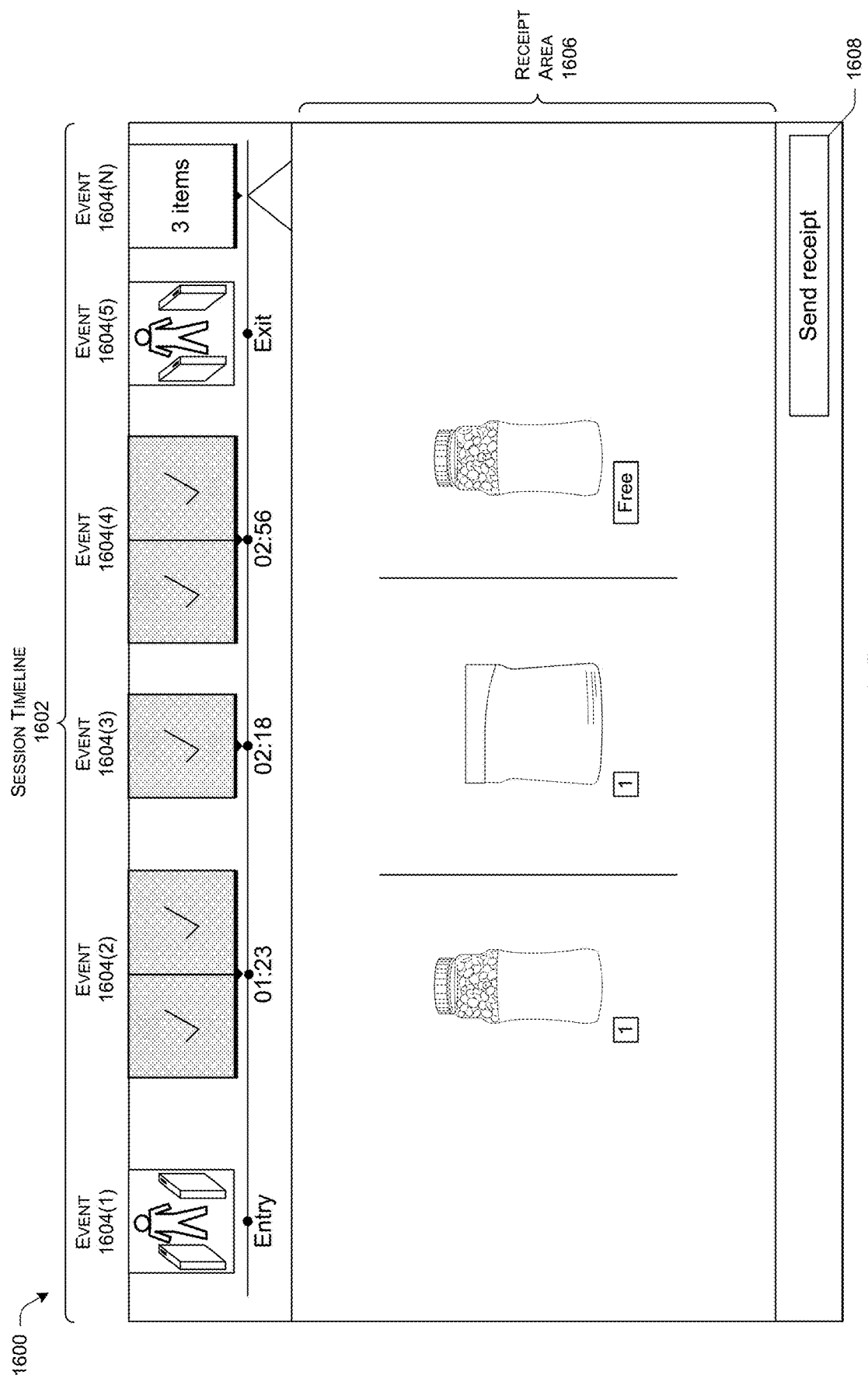
FIG. 16 shows an example UI that presents a receipt for a session of a user in an inventory facility that includes a count of items taken by the user.

FIG. 16 shows an example UI 1600 that presents a receipt for a session of a user in an inventory facility that includes a count of items taken by the user. In some examples, the UI 1600 may be presented in response to receiving a selection of the "review and save" control shown in FIGS. 14 and 15.

Similar to FIGS. 14 and 15, the UI 1600 of FIG. 16 includes a session timeline 1602 which depicts various events 1604 that occurred during the session of the user A. In some examples, various icons or indicators (e.g., checkmarks) may be associated with the events 1604(2), 1604(3), and 1604(4) to indicate that the events 1604 were reviewed and either confirmed or disconfirmed by the escalator associate. The UI 1600 further includes a receipt area 106 which illustrates a number of items and types of items taken from the environment by the user A after all takes and returns were accounted for in the session. Additionally, the receipt area 1606 may depict an item that was marked as free of charge due to the initial associate(s) and escalator associate(s) being unsure as to whether the item was taken or not. Upon reviewing the receipt area 1606 which illustrates the items and amounts of items the user A is being charged with due to taking the items from the environment, the escalator associate may select a send receipt control 1608 and send an indication of the items and the number of items taken from the environment to the inventory management system.

Figure 17:
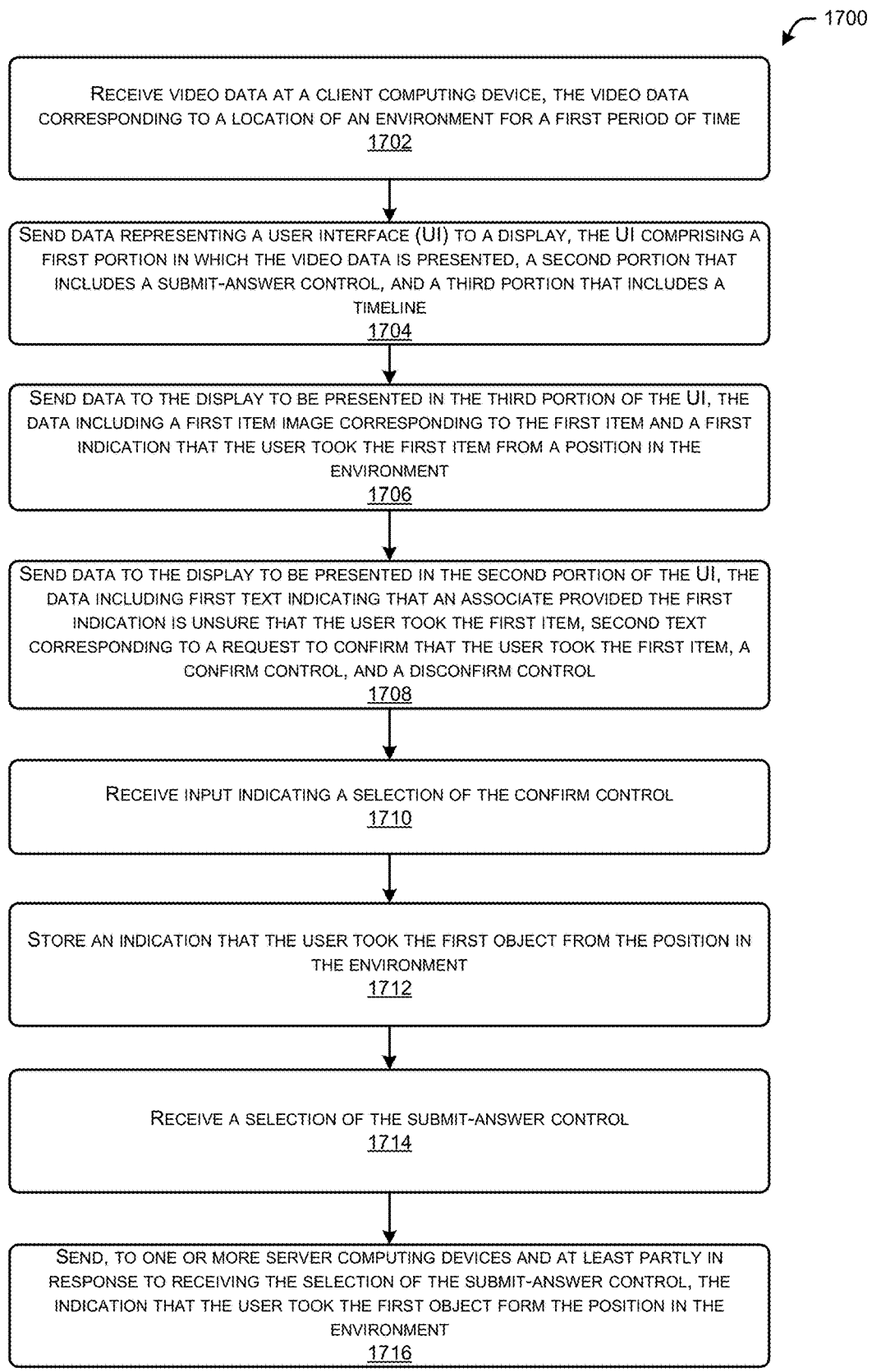
FIG. 17 illustrates a flow diagram of an example process for employing a UI to present a timeline representing events of a session of a user, and receiving input to modify or confirm events of the session.

FIG. 17 illustrates a flow diagram of an example process 1700 for employing a UI to present a timeline representing events of a session of a user, and receiving input to modify or confirm events of the session.

At 1702, a client computing device may receive video data corresponding to a location of an environment for a first period of time and depicting a user at the location for at least a portion of the first period of time, a first item at the location for at least a portion of the first period of time, and a second item at the location for at least a portion of the first period of time.

At 1704, the client computing device may send data representing a user interface to a display associated with the computing device, the user interface (UI) comprising a first portion in which the video data is presented, a second portion that includes a submit-answer control, and a third portion that includes a timeline corresponding to a second period of time including a first time when the customer was detected as entering the environment and a second time when the customer was detected as leaving the environment, the second period of time including the first period of time.

At 1706, the client computing device may send data to the display to be presented in the third portion of the UI adjacent the timeline, the data including a first item image corresponding to the first item and a first indication that the user took the first item from a position in the environment, wherein the first item image is presented adjacent the timeline at a timeline location corresponding a third point in time when the first item was taken.

At 1708, the client computing device may send data to the display to be presented in the second portion of the UI, the data including first text indicating that an associate who provided the first indication that the user took the first item is unsure that the user took the first item, second text corresponding to a request to confirm that the user took the first item, a confirm control, and a disconfirm control.

At 1710, the client computing device may receive input indicating a selection of the confirm control. At 1712, the client computing device may store an indication that the user took the first object from the position in the environment. At 1714, the client computing device may receive input indicating a selection of the submit-answer control.

At 1716, the client computing device may send, to one or more server computing devices and at least partly in response to receiving the selection of the submit-answer control, data representing the indication that the user took the first object from the position in the environment.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
presenting a first user identifier on a display of a computing device, the first user identifier indicating a first user located in an environment with an item;
presenting a second user identifier on the display, the second user identifier indicating a second user located in the environment with the item;
outputting, from the computing device, a request to identify whether the first user or the second user interacted with the item; and
receiving, at the computing device, input indicating that the first user interacted with the item.

2. The method of claim 1, further comprising:
presenting, on the display, a first candidate item identifier;
presenting, on the display, a second candidate item identifier;
outputting, from the computing device, another request to identify the item interacted with by the first user; and
receiving additional input indicating that the item interacted with by the first user corresponds to the first candidate item identifier.

3. The method of claim 1, further comprising:
presenting, on the display, a first interaction identifier indicating a first candidate interaction between the first user and the item, the first candidate interaction representing the first user taking the item from an inventory location in the environment;
presenting, on the display, a second interaction identifier indicating a second candidate interaction between the first user and the item, second first candidate interaction representing the first user placing the item at the inventory location in the environment; and
receiving additional input associated with at least one of the first interaction identifier or the second interaction identifier.

4. The method of claim 1, wherein receiving the input includes receiving a selection of the first user identifier presented on the display.

5. The method of claim 1, further comprising:
receiving video data depicting the first user, the second user, and the item at a location in the environment; and
presenting the video data on the display at least partly while the first user identifier and the second user identifier are presented.

6. The method of claim 5, further comprising:
presenting, on the display, a timeline associated with a length of the video data; and
presenting an event indicator at least one of on or adjacent the timeline, the event indicator corresponding to a point in the video data at which the item was interacted with.

7. The method of claim 1, further comprising:
receiving first video data generated by a first camera in the environment, the first video data depicting the environment;
receiving second video data generated by a second camera in the environment, the second video data depicting the environment;
presenting, on the display, a first graphical icon corresponding to the first video data;
presenting, on the display, a second graphical icon corresponding to the second video data;
receiving additional input data indicating a selection of the first graphical icon; and
presenting the first video data on the display.

8. A method comprising:
presenting a first item identifier on a display of a computing device, the first item identifier representing a first item located in an environment;
presenting a second item identifier on the display, the second item identifier representing a second item located in the environment;
outputting, from the computing device, a request to identify whether a user interacted with the first item or the second item; and
receiving, at the computing device, input indicating that the user interacted with the first item.

9. The method of claim 8, further comprising:
presenting, on the display, a first user identifier indicating a first candidate user that interacted with the first item;
presenting, on the display, a second user identifier indicating a second candidate user that interacted with the first item;
outputting, from the computing device, another request to identify one or more users that interacted with the first item; and
receiving additional input indicating that the first candidate user corresponds to the user that interacted with the first item.

10. The method of claim 8, further comprising:
presenting, on the display, a first interaction identifier indicating a first candidate interaction between the user and the first item at a first inventory location in the environment at which the first item is stored;
presenting, on the display, a second interaction identifier indicating a second candidate interaction between the user and the first item at a second inventory location in the environment at which the second item is stored; and
receiving additional input associated with at least one of the first interaction identifier or the second interaction identifier.

11. The method of claim 8, further comprising:
presenting, on the display, a first interaction identifier indicating a first candidate interaction between the user and the first item, the first candidate interaction representing the user taking the first item from an inventory location in the environment;
presenting, on the display, a second interaction identifier indicating a second candidate interaction between the user and the first item, second first candidate interaction representing the user placing the first item at the inventory location in the environment; and
receiving additional input associated with at least one of the first interaction identifier or the second interaction identifier.

12. The method of claim 8, wherein receiving the input includes receiving a selection of the first item identifier presented on the display.

13. The method of claim 8, further comprising:
receiving video data depicting the first item, the second item, and the user at a location in the environment; and
presenting the video data on the display at least partly while the first item identifier and the second item identifier are presented.

14. The method of claim 13, further comprising:
presenting, on the display, a timeline associated with a length of the video data; and presenting an event indicator at least one of on or adjacent the timeline, the event indicator corresponding to a point in the video data at which the first item was interacted with.

15. The method of claim 8, further comprising:
receiving first video data generated by a first camera in the environment;
receiving second video data generated by a second camera in the environment;
presenting, on the display, a first graphical icon corresponding to the first video data;
presenting, on the display, a second graphical icon corresponding to the second video data;
receiving additional input data indicating a selection of the first graphical icon; and
presenting the first video data on the display.

16. A computing device comprising:
a display;
one or more processors; and
one or more computer-readable media storing computer-executable instructions that, when executed on the one or more processors, cause the one or more processors to perform acts comprising:
presenting a first interaction identifier on the display, the first interaction identifier indicating a first interaction between a user and an item in an environment;
presenting a second interaction identifier on the display, the second interaction identifier indicating a second interaction between the user and the item;
outputting a request to identify the user performed the first interaction or the second interaction with the item; and
receiving input indicating that the performed the first interaction with the item.

17. The computing device of claim 16, wherein:
the first interaction comprises a first of the user taking the item from an inventory location or placing the item at the inventory location; and
the second interaction comprises a second of the user taking the item from the inventory location or placing the item at the inventory location.

18. The computing device of claim 16, the acts further comprising:
receiving video data depicting the item and the user at a location in the environment; and
presenting the video data on the display at least partly while the first interaction identifier and the second interaction identifier are presented.

19. The computing device of claim 18, the acts further comprising:
presenting, on the display, a timeline associated with a length of the video data; and
presenting an event indicator at least one of on or adjacent the timeline, the event indicator corresponding to a point in the video data at which the item was interacted with.

20. The computing device of claim 16, the acts further comprising:
receiving first video data generated by a first camera in the environment;
receiving second video data generated by a second camera in the environment;
presenting, on the display, a first graphical icon corresponding to the first video data;
presenting, on the display, a second graphical icon corresponding to the second video data;
receiving additional input data indicating a selection of the first graphical icon; and
presenting the first video data on the display.

* * * * *